United States Patent
Mehta et al.

(10) Patent No.: US 7,319,077 B2
(45) Date of Patent: Jan. 15, 2008

(54) POLYMER BLENDS AND NONWOVEN ARTICLES THEREFROM

(75) Inventors: Aspy K. Mehta, Humble, TX (US); Chia Yung Cheng, Seabrook, TX (US); Sudhin Datta, Houston, TX (US); Wen Li, Houston, TX (US); Chon Y. Lin, Houston, TX (US); Srivatsan S. Iyer, Pearland, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 140 days.

(21) Appl. No.: 11/299,167

(22) Filed: Dec. 9, 2005

(65) Prior Publication Data

US 2006/0172647 A1 Aug. 3, 2006

Related U.S. Application Data

(60) Provisional application No. 60/637,429, filed on Dec. 17, 2004.

(51) Int. Cl.
*D04H 1/00* (2006.01)
*D04H 3/00* (2006.01)
*D04H 5/00* (2006.01)
*B32B 25/02* (2006.01)

(52) U.S. Cl. .................. 442/361; 442/333; 442/352; 442/357; 442/360; 428/296.7

(58) Field of Classification Search ........... 442/327, 442/333, 352, 357, 360, 361; 428/296.7, 428/299.7, 362, 364, 365

See application file for complete search history.

(56) References Cited

U.S. PATENT DOCUMENTS

| | | |
|---|---|---|
| 3,262,992 A | 7/1966 | Holzer et al. |
| 3,378,606 A | 4/1968 | Kontos |
| 3,853,969 A | 12/1974 | Kontos |
| 3,882,197 A | 5/1975 | Fritz et al. |
| 3,888,949 A | 6/1975 | Shih |
| 4,461,872 A | 7/1984 | Su |
| 4,665,130 A | 5/1987 | Hwo |
| 4,921,749 A | 5/1990 | Bossaert et al. |
| 5,079,273 A | 1/1992 | Kuroda et al. |
| 5,171,628 A | 12/1992 | Arvedson et al. |
| 5,213,744 A | 5/1993 | Bossaert |
| 5,290,635 A | 3/1994 | Matsumura et al. |
| 5,298,561 A | 3/1994 | Cecchin et al. |
| 5,331,047 A | 7/1994 | Giacobbe |
| 5,453,318 A | 9/1995 | Giacobbe |
| 5,504,172 A | 4/1996 | Imuta et al. |
| 5,652,308 A | 7/1997 | Merrill et al. |
| 5,723,217 A | 3/1998 | Stahl et al. |

(Continued)

FOREIGN PATENT DOCUMENTS

EP 0 374 695 6/1990

(Continued)

OTHER PUBLICATIONS

"Elastomeric Polypropylenes from Alumina-Supported Tetraalkyl Group IVB Catalysts. 1. Synthesis and Properties of High Molecular Weight Stereoblock Homopolymers," and "Elastomeric Polypropylenes from Alumina-Supported Tetraalkyl Group IVB Catalysts. 2. Chain Microstructure, Crystallinity, and Morphology," Collette et al, Macromolecules, vol. 22, 3851-3866, 1989.

*Primary Examiner*—Lynda Salvatore
(74) *Attorney, Agent, or Firm*—Catherine L. Bell

(57) ABSTRACT

This invention relates to a nonwoven article comprising a heterogeneous blend comprising:

1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 2000 dg/min or less; and 2) from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and or C4 to C10 alpha-olefin comonomers, said semi-amorphous polymers each having:

a) heat of fusion of 4 to 70 J/g;
b) a Melt Flow Rate of 0.1 to 2000 dg/min;
c) an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
d) an Mw/Mn of 1.5 to 4, and
e) a propylene triad tacticity, as measured by $^{13}$C NMR, of 75% or greater; where the blend of the semi-crystalline and semi-amorphous polymers comprises less than 5 weight % filler, based upon the weight of the polymers and the filler, and the blend has:
i) an MFR greater than 10 dg/min; and
ii) a Permanent Set of greater than 65% (as measured on a 125 mil thick molded part); and where the nonwoven article has a Hand of 40 g or less at a fabric basis weight of 35 gsm.

65 Claims, 4 Drawing Sheets

U.S. PATENT DOCUMENTS

| | | |
|---|---|---|
| 5,726,103 A | 3/1998 | Stahl et al. |
| 5,736,465 A | 4/1998 | Stahl et al. |
| 5,763,080 A | 6/1998 | Stahl et al. |
| 5,891,814 A | 4/1999 | Richeson et al. |
| 5,910,362 A | 6/1999 | Aratake et al. |
| 5,959,006 A | 9/1999 | Pungtrakul |
| 5,994,482 A | 11/1999 | Georgellis et al. |
| 6,010,588 A | 1/2000 | Stahl et al. |
| 6,017,615 A | 1/2000 | Thakker et al. |
| 6,080,818 A | 6/2000 | Thakker et al. |
| 6,096,420 A | 8/2000 | Wilhoit et al. |
| 6,143,818 A | 11/2000 | Wang et al. |
| 6,153,703 A | 11/2000 | Lustiger et al. |
| 6,165,599 A | 12/2000 | Demeuse |
| 6,187,449 B1 | 2/2001 | Sasaki et al. |
| 6,342,565 B1 | 1/2002 | Cheng et al. |
| 6,388,013 B1 | 5/2002 | Saraf et al. |
| 6,476,135 B1 | 11/2002 | Bugada et al. |
| 6,500,563 B1 | 12/2002 | Datta et al. |
| 6,503,588 B1 | 1/2003 | Hayashi et al. |
| 6,525,157 B2 | 2/2003 | Cozewith et al. |
| 6,531,214 B2 | 3/2003 | Carter et al. |
| 6,583,076 B1 | 6/2003 | Pekrul et al. |
| 6,635,715 B1 | 10/2003 | Datta et al. |
| 6,642,316 B1 | 11/2003 | Datta et al. |
| 6,747,114 B2 | 6/2004 | Karandinos et al. |
| 6,750,284 B1 | 6/2004 | Dharmarajan et al. |
| 6,875,485 B2 | 4/2005 | Kanai et al. |
| 6,887,941 B2 | 5/2005 | Zhou |
| 6,900,147 B2 | 5/2005 | Morman et al. |
| 6,906,160 B2 | 6/2005 | Stevens et al. |
| 6,921,794 B2 | 7/2005 | Cozewith et al. |
| 6,984,696 B2 | 1/2006 | Curry et al. |
| 2003/0100238 A1 | 5/2003 | Morman et al. |
| 2003/0213938 A1 | 11/2003 | Farley et al. |
| 2004/0038058 A1 | 2/2004 | Zhou |
| 2004/0122388 A1 | 6/2004 | McCormack et al. |
| 2005/0106978 A1 | 5/2005 | Cheng et al. |
| 2006/0173132 A1* | 8/2006 | Mehta et al. ............. 525/191 |
| 2006/0183860 A1* | 8/2006 | Mehta et al. ............. 525/191 |

FOREIGN PATENT DOCUMENTS

| | | |
|---|---|---|
| EP | 462 574 | 12/1991 |
| EP | 0 400 333 | 11/1995 |
| EP | 0 373 660 | 2/1996 |
| EP | 1 002 814 | 5/2000 |
| EP | 0 629 632 | 10/2000 |
| EP | 1 223 191 | 7/2002 |
| EP | 0 629 631 | 8/2002 |
| EP | 1 003 814 | 10/2002 |
| EP | 1 505 181 | 2/2005 |
| GB | 2 061 339 | 5/1981 |
| WO | WO 94/28042 | 12/1994 |
| WO | WO 99/07788 | 2/1999 |
| WO | WO 99/19547 | 4/1999 |
| WO | WO 00/00564 | 1/2000 |
| WO | WO 00/01745 | 1/2000 |
| WO | WO 00/01766 | 1/2000 |
| WO | WO 00/69963 | 11/2000 |
| WO | WO 00/69965 | 11/2000 |
| WO | WO 00/70134 | 11/2000 |
| WO | WO 01/48034 | 7/2001 |
| WO | WO 02/083753 | 10/2002 |
| WO | WO 03/021569 | 3/2003 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO2004/035681 | 4/2004 |
| WO | WO2004/060994 | 7/2004 |
| WO | WO2004/087806 | 10/2004 |
| WO | WO2005/052052 | 6/2005 |

\* cited by examiner

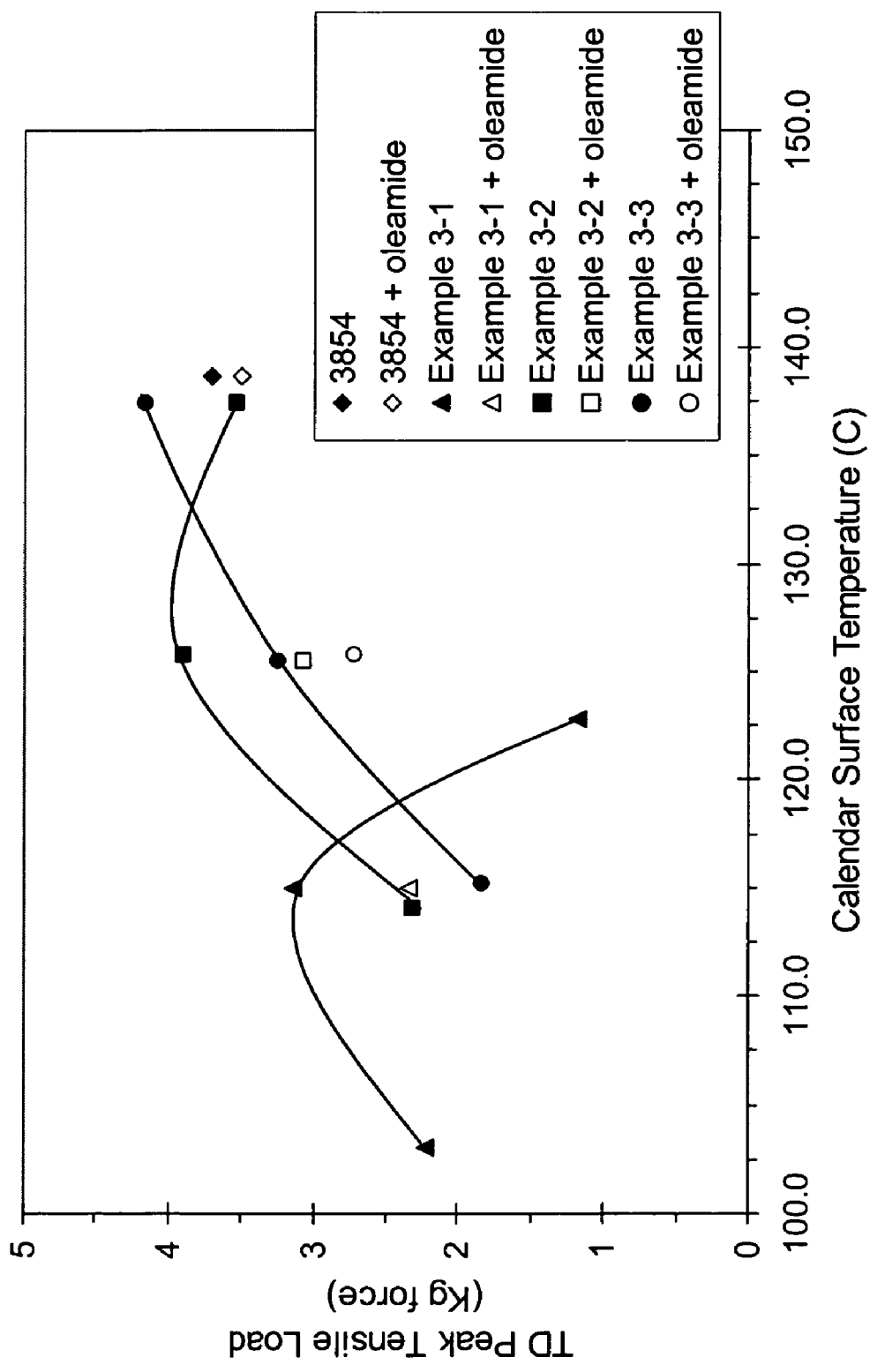
Figure 3: Bonding Curves for 35 gsm Fabrics

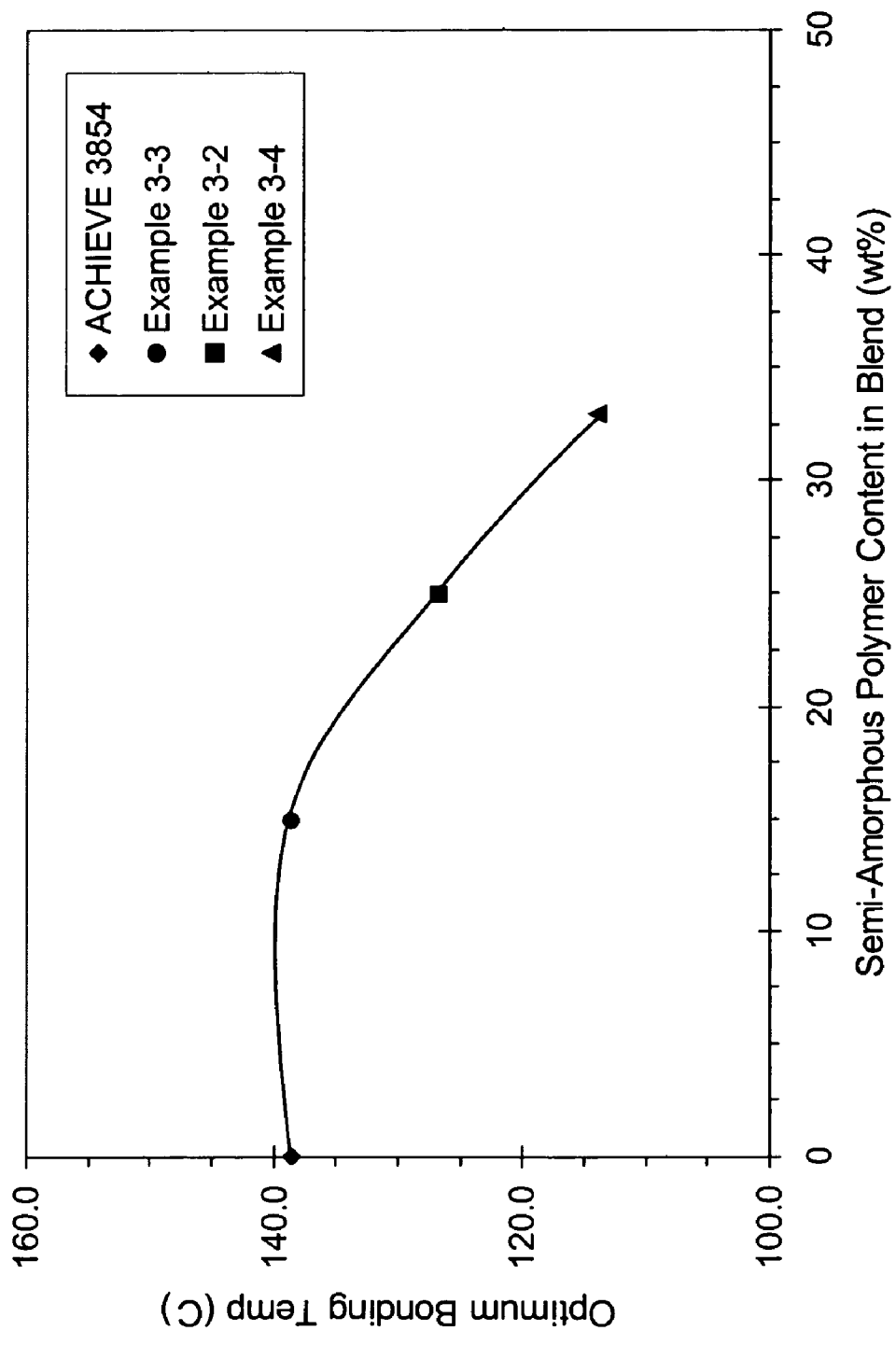

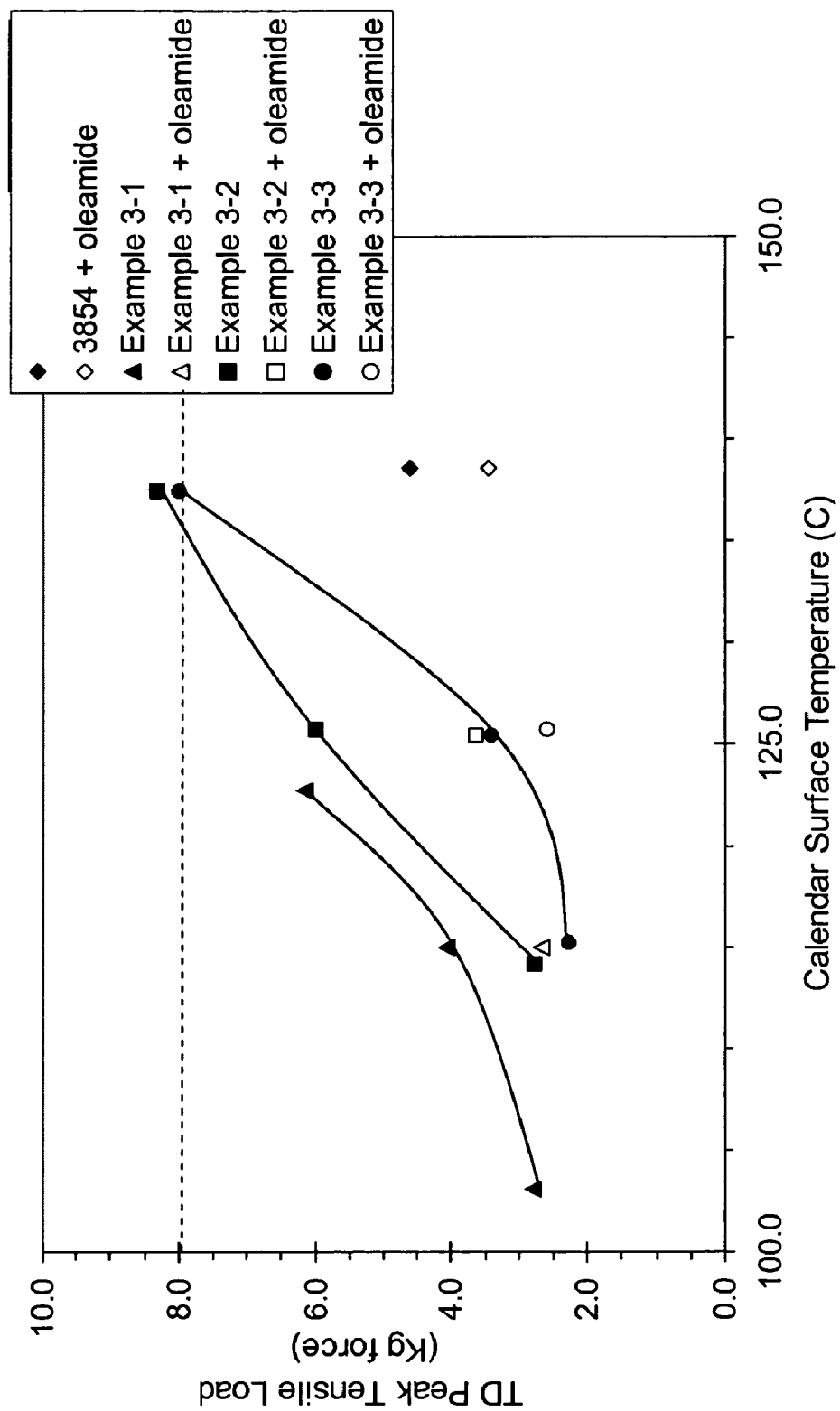
Figure 5: Bonding Curves for 70 gsm Fabrics

POLYMER BLENDS AND NONWOVEN ARTICLES THEREFROM

STATEMENT OF RELATED CASES

This invention claims the benefit of U.S. Ser. No. 60/637,429 filed Dec. 17, 2004. This patent application is related to U.S. Ser. No. 10/716,306, filed Nov. 18, 2003.

FIELD OF THE INVENTION

This invention relates to polymer blends and articles made therefrom including fibers, nonwovens, and fabrics.

BACKGROUND

Isotactic polypropylene and ethylene/propylene copolymers are often used in the industry to produce articles such as fibers, films, molded parts and nonwoven fabrics. Additionally, blending these polymers with other polymers has also been the subject of past endeavors.

For example, U.S. Pat. No. 3,262,992 suggests the addition of a stereoblock copolymer of ethylene and propylene (having high crystalline melting points) to isotactic polypropylene leads to improved mechanical properties of the blend compared to isotactic polypropylene alone.

U.S. Pat. Nos. 3,853,969 and 3,378,606, suggest the formation of in situ blends of isotactic polypropylene and "stereo block" copolymers of propylene and another olefin of 2 to 12 carbon atoms, including ethylene and hexene.

U.S. Pat. No. 3,882,197 suggests blends of stereoregular propylene/alpha-olefin copolymers, stereoregular propylene, and ethylene copolymer rubbers.

U.S. Pat. No. 3,888,949 suggests the synthesis of blend compositions containing isotactic polypropylene and copolymers of propylene and an alpha-olefin, containing between 6-20 carbon atoms, which have improved elongation and tensile strength over either the copolymer or isotactic polypropylene. Copolymers of propylene and alpha-olefin are described wherein the alpha-olefin is hexene, octene or dodecene.

U.S. Pat. No. 4,461,872, discloses a blend produced in part by the use of another heterogeneous catalyst system which is expected to form copolymers which have statistically significant intramolecular and intermolecular compositional differences.

Two publications in the Journal of Macromolecules, 1989, volume 22, pages 3851-3866 describe blends of isotactic polypropylene and partially atactic polypropylene which purportedly have desirable tensile elongation properties.

U.S. Pat. Nos. 5,723,217; 5,726,103; 5,736,465; 5,763,080; and 6,010,588 suggest several metallocene catalyzed processes to make polypropylene to produce fibers and fabric. U.S. Pat. No. 5,891,814, discloses a dual metallocene-generated propylene polymer used to make spunbond fibers. WO 99/19547 discloses a method for producing spunbonded fibers and fabric derived from a blend of a propylene homopolymer and a copolymer of polypropylene.

U.S. Pat. No. 6,342,565 and its equivalent WO 00/070134 disclose, at Table 4, column 24, fibers comprising 80, 90, and 95 weight % of Achieve 3854 and 20, 10 and 5 weight %, respectively of a propylene/ethylene copolymer having 13.5% ethylene and an ML of 12. These particular blends are not made into films, molded articles or nonwoven materials. The fibers in Table 4 are reported to be inelastic and are unsuitable in the elastic applications desired in U.S. Pat. No. 6,342,565.

U.S. Pat. No. 6,525,157; U.S. Pat. No. 5,504,172; and WO 00/01745 disclose various propylene/ethylene copolymers. US 2003/0130430 discloses blends of two different propylene ethylene copolymers. U.S. Pat. No. 6,642,316, WO 00/070134, WO 00/01766, U.S. Pat. No. 6,500,563; U.S. Pat. No. 6,342,565 and WO 00/69963 disclose elastic blends of crystalline polypropylene and propylene/ethylene copolymers. U.S. Pat. No. 6,153,703 discloses blends of semicrystalline copolymers and propylene ethylene polymers having very high toughness without loss in modulus. EP 0 629 632 and EP 0 629 631 disclose blends of polypropylene and ethylene-propylene copolymers having certain triad tacticities and proportions of inversely inserted propylene units.

U.S. Pat. No. 6,635,715 and its equivalents EP 1 003 814 B1 and WO 99/07788 disclose blends of polypropylene and Escorene 4292 with propylene/ethylene copolymers for use as thermoplastic elastomers.

EP 0 374 695 A1 discloses visually homogeneous blends of an ethylene-propylene copolymer and Profax™ 6331 by Basell.

U.S. Pat. No. 6,750,284 discloses thermoplastic membranes comprising propylene-ethylene copolymers and up to 40 wt % polypropylene.

WO 03/040095, WO 03/040201, WO 03/040233, and WO 03/040442 disclose various propylene-ethylene copolymers made with non-metallocene catalyst compounds. WO 03/040202 discloses films and sealants made from the propylene-ethylene copolymers made with non-metallocene catalyst compounds.

Additional references of interest include WO 94/28042, EP 1 002 814, WO 00/69965, WO 01/48034, W004035681A2, EP 0 400 333 B1, EP 0 373 660 B1, and W004060994A1.

This invention is also related to copending U.S. application Ser. No. 10/402,275 filed Mar. 28, 2003.

However, none of the above disclose non-woven articles having a balanced set of properties comprising good processability on commercial fabric-forming equipment, a soft aesthetically-pleasing feel, good drapeability, a reduction in value of optimum bonding temperature leading to a broader bonding window, good tensile properties and tear resistance.

SUMMARY

This invention relates to a nonwoven article comprising a heterogeneous blend comprising:

1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 2000 dg/min or less (preferably 100 dg/min or less); and 2) from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and or C4 to C10 alpha-olefin comonomers, said semi-amorphous polymers each having:

a) heat of fusion of 4 to 70 J/g;

b) a Melt Flow Rate of 0.1 to 2000 dg/min (preferably 100 dg/min or less);

c) an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and d) an Mw/Mn of 1.5 to 4, and e) a propylene triad tacticity, as measured by $^{13}$C NMR, of 75% or greater; where the blend of the semi-crystalline and semi-amorphous polymers comprises less than 5 weight % filler, based upon the weight of the polymers and the filler, and the blend has:

i) an MFR greater than 10 dg/min, preferably greater than 30 dg/min; and ii) a Permanent Set of greater than 65% (as measured on a 125 mil thick molded part); and where the nonwoven article has a Hand of 40 g or less, at a fabric basis weight of 35 gsm.

In a preferred embodiment, the blend of the semi-crystalline and semi-amorphous polymers is a heterogeneous blend, preferably where the semi-cyrstalline polymer is the continuous phase and the semi-amorphous polymer is the discontinuous phase.

By heterogeneous blend is meant a composition having two or more morphological phases in the same state. For example a blend of two polymers where one polymer forms discrete packets dispersed in a matrix of another polymer is said to be heterogeneous in the solid state. Also heterogeneous blend is defined to include co-continuous blends where the blend components are separately visible, but it is unclear which is the continuous phase and which is the discontinuous phase. Such morphology is determined using scanning electron microscopy (SEM) or atomic force microscopy (AFM), in the event the SEM and AFM provide different data, then the SEM shall be used. By continuous phase is meant the matrix phase in a heterogeneous blend. By discontinuous phase is meant the dispersed phase in a heterogeneous blend.

By homogeneous blend is meant a composition having substantially one morphological phase in the same state. For example a blend of two polymers where one polymer is miscible with another polymer is said to be homogeneous in the solid state. Such morphology is determined using scanning electron microscopy. By miscible is meant that that the blend of two or more polymers exhibits single-phase behavior for the glass transition temperature, e.g. the Tg would exist as a single, sharp transition temperature on the DMTA trace. By contrast, two separate transition temperatures would be observed for an immiscible blend, typically corresponding to the temperatures for each of the individual components of the blend. Thus a polymer blend is miscible when there is one Tg indicated on the DMTA trace. A miscible blend is homogeneous, while an immiscible blend is heterogeneous.

BRIEF DESCRIPTION OF THE DRAWINGS

FIG. 3 is a plot of TD Peak Tensile load vs Calendar Surface temperature for 35 gsm fabrics from Blend Examples 3-1,3-2, 3-3 and a homopolymer control.

FIG. 4 is a plot of the Optimum Bonding temperature for 35 gsm fabrics from the Example blends vs the Content of Semi-amorphous polymer in the blends.

FIG. 5 is a plot of TD Peak Tensile load vs Calendar Surface temperature for 70 gsm fabrics from Blend Examples 3-1,3-2, 3-3 and a homopolymer control.

DETAILED DESCRIPTION

Figure 1:
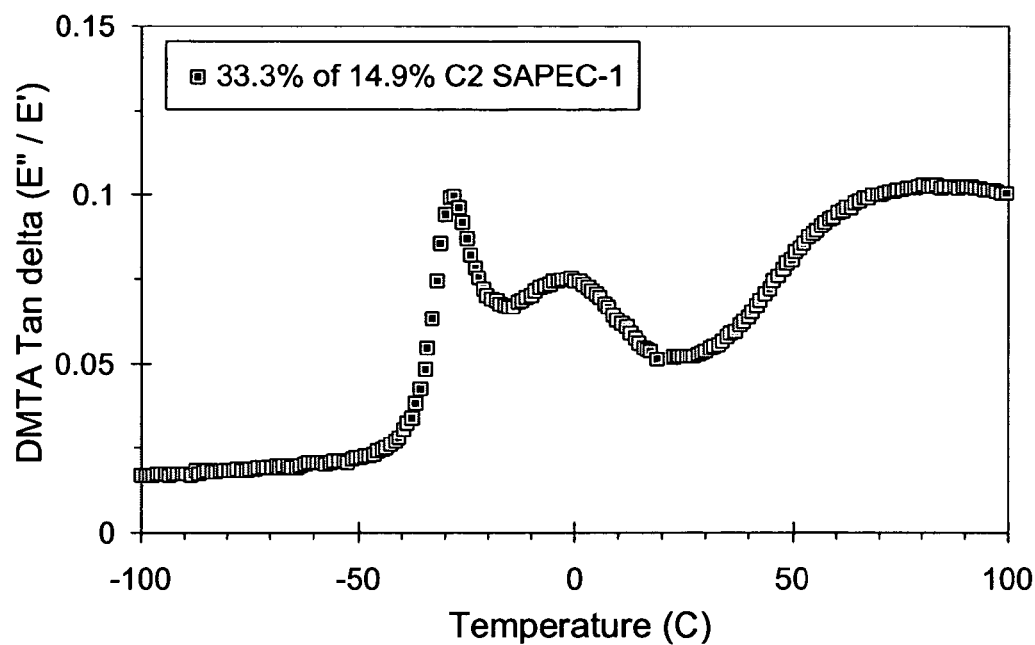
FIG. 1 is a plot of tan delta (δ) (E"/E' from DMTA measurements) versus temperature for blend polymer Example 3-1.

For purposes of this invention and the claims thereto, the term copolymers means any polymer comprising two or more monomers. For the purposes of this invention and the claims thereto when a polymer is referred to as comprising a monomer, the monomer present in the polymer is the polymerized form of the monomer. Likewise when catalyst components are described as comprising neutral stable forms of the components, it is well understood by one of ordinary skill in the art, that the active form of the component is the form that reacts with the monomers to produce polymers. The new notation numbering scheme for the Periodic Table Groups is used herein as set out in CHEMICAL AND ENGINEERING NEWS, 63(5), 27 (1985).

As used herein, the term "nonwoven" or "nonwoven fabric" refers to any material made from the aggregation of fibers fabricated by methods such as, for example, spunbonding, melt blowing, thermobonding, or combinations thereof.

As used herein, the terms "multilayer laminate", "laminate", and "composite" refer to a layered structure wherein some of the layers may be spunbond fabric and some may be meltblown fabric such as, for example, spunbond/meltblown/spunbond ("SMS") laminate and others disclosed in, or other substrates such as films, netting, or other synthetic or natural material such as disclosed in, for example, U.S. Pat. Nos. 4,041,203; 5,169,706; 5,145,727; 5,178,931 and 5,188,885. Such laminates or composites may also contain multiple layers of spunbond and meltblown fabrics in various combinations such as SMS, SSMMSS, etc. The laminates and composites of the present invention may comprise layers of the same or different materials. Each layer may also comprise a material or a combination of materials. Each layer may also comprise sub-layers.

As used herein, anisotropic behavior refers to fabrics having different properties in different directions. For example, a fabric demonstrating anistropic elongation would have an elongation in the machine direction (MD) different from its elongation measured in the transverse direction (TD). The same fabric may also be characterized as having an asymmetric stretch. In this example, the anisotropic behavior typically has elongation in the machine direction (MD) substantially less than the elongation in the transverse direction (TD). The term substantially, in this context, means less than 90%, alternatively less than 80%, or less than 75%.

As used herein, the term "polypropylene", "propylene polymer," or "PP" refers to homopolymers, copolymers, terpolymers, and interpolymers, comprising from 50 to 100 weight % of propylene.

As used herein, the term "reactor grade" refers to polyolefin resin whose molecular weight distribution (MWD), or polydispersity, has not been substantially altered after polymerization, except for pelletizing with an antioxidant. The term particularly includes polyolefins which, after polymerization, have not been treated, or subjected to treatment, to substantially reduce viscosity or substantially reduce average molecular weight.

As used herein, "metallocene" means one or more compounds represented by the formula $Cp_mMR_nX_q$, wherein Cp is a cyclopentadienyl ring which may be substituted, or derivative thereof (such as indene or fluorene) which may be substituted; M is a Group 4, 5, or 6 transition metal, for example titanium, zirconium, hafnium, vanadium, niobium, tantalum, chromium, molybdenum and tungsten; R is a substituted or unsubstituted hydrocarbyl group or hydrocarboxy group having from one to 20 carbon atoms; X may be a halide, a hydride, an alkyl group, an alkenyl group or an arylalkyl group; and m=1-3; n=0-3; q=0-3; and the sum of m+n+q is equal to the oxidation state of the transition metal, further if m is 2 or 3 then any two Cp groups may be bound to one another through a bridging group T, which is typically a group 14 atom which may be substituted with one or two hydrocarbyl groups (a preferred example includes $(CH_3)_2$—Si), if m is 1 then the Cp group may be bound to R via a bridging group T which is typically a group 14 atom which may be substituted with one or two hydrocarbyl groups (a preferred example includes $(CH_3)_2$—Si).

Abbreviations may be used including: Me=methyl, Et=ethyl, Bu=butyl, Ph=phenyl, Cp=cyclopentadienyl, Cp*=pentamethyl cyclopentadienyl, Ind=indenyl, and Flu=fluorene.

As used herein, "support" or "support composition" refers to compounds that are particulate and porous that may optionally be calcined or contacted with a halogen. For example, a fluorided support composition can be a silicon dioxide support wherein a portion of the silica hydroxyl groups has been replaced with fluorine or fluorine containing compounds. Suitable fluorine containing compounds include, but are not limited to, inorganic fluorine containing compounds and/or organic fluorine containing compounds.

As used herein, "metallocene catalyst system" is the product of contacting components: (1) one or more metallocenes; (2) one or more activators; and (3) optionally, one or more support compositions. Preferred activators include alumoxanes (including methylalumoxane and modified-methylalumoxane), stoichiometric activators, ionic activators, non-coordinating anions and the like.

As used herein "semi-crystalline polymer" is defined to be an olefin polymer having a melting point (Tm) of 100° C. or more (as measured by DSC-second melt, described below). As used herein a "semi-amorphous polymer" is defined to be an olefin polymer having a heat of fusion of between 4 and 70 J/g (as determined by DSC, described below). Melting point (Tm), peak crystallization temperature (Tc), heat of fusion (Hf) and percent crystallinity are determined using the following procedure according to ASTM E 794-85. Differential scanning calorimetric (DSC) data is obtained using a TA Instruments model 2910 machine or a Perkin-Elmer DSC 7 machine. In the event that the TA Instruments 2910 machine and the Perkin-Elmer DSC-7 machine produce different DSC data, the data from the TA Instruments model 2910 shall be used. Samples weighing approximately 5-10 mg are sealed in aluminum sample pans. The DSC data is recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity. The percent crystallinity (X %) is calculated using the formula, X %=[area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. For the semi-crystalline polymers, having appreciable crystallinity, the melting temperature is typically measured and reported during the second heating cycle (or second melt). For the semi-amorphous polymers, having comparatively low levels of crystallinity, the melting temperature is typically measured and reported during the first heating cycle. Prior to the DSC measurement, the sample is aged (typically by holding it at ambient temperature for a period up to about 5 days) or annealed to maximize the level of crystallinity.

As used herein, the softness of a nonwoven fabric is measured according to the "Handle-O-Meter" test as specified in operating manual on Handle-O-Meter model number 211-5 from the Thwing-Albert Instrument Co., 10960 Dutton Road, Phila., Pa., 19154. The Handle-O-Meter reading is in units of grams. The lower the value of hand (grams), the softer the fabric. The modifications are: 1. Two specimens per sample were used and 2. Readings are kept below 100 gram by adjusting the slot width used and the same slot width is used through out the whole series of samples being compared, preferably 10 mm.

As used herein, molecular weight (Mn and Mw) and molecular weight distribution (MWD or Mw/Mn) are determined by gel permeation chromatography using polystyrene standards. The GPC data were taken on a Waters 150 GPC using three Shodex mixed bed AT-80M/S columns. The solvent used was 1,2,4 trichlorobenzene that contains 300 ppm of the antioxidant Santonox R. The run conditions were an operating temperature of 145 C, a nominal flow rate of 1.0 ml/min and a 300 μL injection volume. Solutions for injection were typically 1.0 to 1.5 mg/ml. The columns were calibrated by running a series of narrow molecular weight polystyrene (PS) standards and recording their retention volumes. Polypropylene (PP) molecular weight values were calculated using the "universal calibration" approach and the following Mark-Houwink coefficients:

|    | k (dL/g)              | a    |
|----|-----------------------|------|
| PS | $1.75 \times 10^{-4}$ | 0.67 |
| PP | $8.33 \times 10^{-5}$ | 0.80 |

A third order fit is used to fit the Log (MW) vs Retention volume points. The data were taken and analyzed by Waters Millenium software.

A clarifying agent is defined to by any agent that causes at least a 10%, preferably at least 15%, more preferably at least 20% reduction in haze (as measured on a 1 mm molded chip according to ASTM D 1003) as compared to the same composition without the clarifying agent. A nucleating agent is defined to be an additive which forms nuclei in a polymer melt to promote the growth of crystals (adipic acid, benzoic acid, or metal salts of these acids, sorbitols, such as 3,4-dimethylbenzylidene sorbitol are examples of nucleating agents, as are many inorganic fillers).

Blend Components-Semi-Crystalline Polymer

In a preferred embodiment, the blends of this invention comprise from 60 to 99 weight percent of one or more semi-crystalline polymers (based upon the weight of the semi-crystalline and semi-amorphous polymers), preferably from 60 to 90 weight %, preferably from 60 to 85 weight %, preferably from 60 to 75 weight %, each semi-crystalline polymer comprising propylene and from 0 to 5 weight % alpha-olefin comonomer (based upon the weight of the polymer), preferably from 0.1 to 4 weight %, preferably from 0.25 to 3 weight %. Preferably the alpha olefin comonomer is a C2 to C10 alpha olefin, preferably selected from the group consisting of ethylene, butene, pentene, hexene, heptene, octene, nonene, and decene, preferably ethylene, butene, hexene, and octene, preferably ethylene. (For purposes of this invention when a copolymer is described as comprising propylene and one or more C2 to C 10 olefins, or alpha olefins, the C2 to C10 olefins or alpha olefins do not include C3 e.g. propylene.)

Preferred semi-crystalline polymers have a melting point (Tm—second melt as measured by DSC as described above) between 100 and 160° C., preferably between 110 and 160° C., preferably between 125 and 160° C.

Preferred semi-crystalline polymers have a melt flow rate of from 0.1 to 2000 dg/min, preferably 15 to 50 dg/min (ASTM 1238-D, 2.16 kg, 230° C.), especially for spun bond applications, and preberably 700-2000 dg/min for melt blown nonwoven applications.

Preferred semi-crystalline polymers have an Elongation at Break of 700% or less, preferably 300 to 700%, as measured by ASTM D 638, 2 in/min/50 mm/min on a 0.125 in (3.18 mm) thick injection molded sample).

Preferred semi-crystalline polymers have a 1° Secant Flexural Modulus of from 150,000 psi to 250,000 psi (1031 to 1720 MPa) as measured by ASTM 790A (0.05 in/min/1.3 mm/min). "High-crystallinity polypropylenes," e.g. those having values above 250,000 psi (1720 MPa) can also be used.

Any propylene polymer having 0 to 5 weight % comonomer, a melting point between 100 and 160, and an MFR of 200 dg/min or less may be used in the practice of this invention. Suitable examples include polymers produced by Ziegler-Natta catalyst systems, metallocene systems, and the like. The polymers may be produced by any means including solution, slurry, gas phase, supercritical or high pressure. In a particularly preferred embodiment the propylene polymers useful herein have a molecular weight distribution (Mw/Mn) of 5 or less preferably between 1.5 and 4 preferably between 1.5 and 3. In another preferred embodiment, preferred propylene polymers useful herein include those produced by metallocene catalyst systems. In another embodiment preferred propylene polymers useful herein include those having a composition distribution breadth index (CDBI) of 60% or more, preferably 70% or more, preferably 80% or more, preferably 90% or more. (CDBI is measured as described in WO 93/03093, with the modification that any fractions having a weight average molecular weight (Mw) below 25,000 g/mol are disregarded.) Preferred propylene polymers that can be used in the practice of this invention include those propylene polymers sold by ExxonMobil Chemical Company under the tradename ACHIEVE™. Particularly useful grades include ACHIEVE™ 3854, ACHIEVE™ 1654E1, ACHIEVE™3825, ACHIEVE™1605, available from ExxonMobil Chemical Company in Houston, Tex. Additional preferred propylene polymers useful in the practice of this invention include those propylene homopolymers, and random copolymers available from ExxonMobil Chemical Company under the grade names: PP1024E4, PP1042, PP1032, PP1044, PP1052, PP1105E1, PP3155 and PP9852E1, PP9272, PP9513, PP9544, PP9562. In some instances impact copolymers can be utilized in the practice of this invention. Several are available from ExxonMobil Chemical Company (e.g. PP7032 E2).

In another embodiment preferred semi-crystalline polymer useful herein have a melting point greater than 110° C., preferably greater than 115° C., and most preferably greater than 130° C. and/or a heat of fusion of greater than 60 J/g, preferably at least 70 J/g, preferably at least 80 J/g, as determined by DSC analysis described above.

The molecular weight of the semi-crystalline polymer can be between 10,000 g/mol to 5,000,000, g/mol, alternatively 50,000 g/mol to 500,000 g/mol, preferably with a polydispersity index (PDI-Mw/Mn) between 1.5 to 4, preferably 1.5 to 3.

Preferred semi-crystalline polymers may be isotactic, highly isotactic, syndiotactic, or highly syndiotactic. In one embodiment, the semi-crystalline polymer is an isotactic polypropylene. In another embodiment, the semi-crystalline polymer is a highly isotactic polypropylene. As used herein, "isotactic" is defined as having at least 10% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C-NMR. In a desirable embodiment, a polypropylene homo- or co-polymer having at least 85% isotacticity is the semi-crystalline polymer. In another embodiment, the semi-crystalline polymer has at least 90% isotacticity. As used herein, "syndiotactic" is defined as having at least 10% syndiotactic pentads, preferably at least 40%, according to analysis by $^{13}$C-NMR. As used herein, "highly syndiotactic" is defined as having at least 60% syndiotactic pentads according to analysis by $^{13}$C-NMR. In a desirable embodiment, a polypropylene homo- or co-polymer having at least 85% syndiotacticity is the semi-crystalline polymer. In another embodiment, a propylene homo- or co-polymer having at least 90% syndiotacticity is the semi-crystalline polymer.

Blend Components-Semi-Amorphous Polymer

In a preferred embodiment, blends of this invention comprise from 1 to 40 weight percent of one or more semi-amorphous polymers (based upon the weight of the semi-crystalline and semi-amorphous polymers), preferably from greater than 10 to 40 weight %, preferably from 15 to 40 weight %, preferably from 25 to 40 weight %. In some embodiments, the semi-amorphous polymers comprise propylene and from 10 to 25 weight % of one or more C2 to C10 alpha-olefin comonomers, preferably from 10 to 20 weight %, preferably from 12 to 20 weight %, based upon the weight of the copolymer. Preferably the alpha olefin comonomer is a C2 to C10 alpha olefin selected from the group consisting of ethylene, butene, pentene, hexene, heptene, octene, nonene, and decene, preferably ethylene, butene, hexene, and octene, preferably ethylene.

Preferred semi-amorphous polymers having from 10 to 25 weight % comonomers useful in this invention preferably have a percent crystallinity of 2.5 to 35, preferably from 2.5 to 25%, preferably from 5 to 23%, preferably from 5 to 20%. Percent crystallinity is determined according to the DSC procedure described above.

Preferred semi-amorphous polymers useful in this invention preferably have a Melt Flow Rate of 0.1 to 2000 dg/min, preferably 15 to 50 dg/min (as measured by ASTM 1238, 2.16 kg and 230° C.) especially for spun bond applications, and preferably 700-2000 dg/min for melt blown nonwoven applications.

Preferred semi-amorphous polymers useful in this invention preferably have a DSC melting point of 105° C. or less, preferably 90° C. or less, preferably between 25 and 90° C., preferably between 30 and 80° C., preferably between 35 and 75° C., as measured by the DSC procedure described above.

Preferred semi-amorphous polymers useful in this invention preferably have an intermolecular composition distribution of 75% or more, preferably 80% or more, preferably 85% or more, preferably 90% or more by weight of the polymer isolated as one or two adjacent, soluble fractions with the balance of the polymer in immediately preceding or succeeding fractions; and wherein each of these fractions has a weight % comonomer content with a difference of no greater than 20 wt % (relative), preferably 10% (relative), of the average weight % comonomer of the copolymer. The fractions are obtained at temperature increases of approximately 8C between stages. The intermolecular composition distribution of the copolymer is determined by thermal fractionation in hexane as follows: about 30 grams of the semi-amorphous polymer is cut into small cubes of about $\frac{1}{8}$ inch (0.32 cm) on the side and is then introduced into a thick walled glass bottle closed with screw cap along with 50 mg of Irganox1076, an antioxidant commercially available from Ciba-Geigy Corporation. Then, 425 ml of hexane (a principal mixture of normal and iso isomers) is added to the contents of the bottle and the sealed bottle is maintained at about 23° C. for 24 hours. At the end of this period, the solution is decanted and the residue is treated with additional hexane for an additional 24 hours at 23° C. At the end of this period, the two hexane solutions are combined and evaporated to yield a residue of the polymer soluble at 23° C. To the residue is added sufficient hexane to bring the volume to 425 ml and the bottle is maintained at about 31° C. for 24 hours in a covered circulating water bath. The soluble polymer is decanted and the additional amount of hexane is added for another 24 hours at about 31° C. prior to decanting. In this manner, fractions of the semi-amorphous polymer soluble at 40° C., 48° C., 55° C., and 62° C. are obtained at temperature increases of approximately 8° C. between stages. The soluble polymers are dried, weighed and analyzed for composition, as wt % ethylene content. To produce a copolymer having the desired narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

Preferred semi-amorphous polymers useful in this invention preferably have a molecular weight distribution (Mw/Mn) of Mw/Mn of less than 5, preferably between 1.5 and 4, preferably between 1.5 and 3.

In another embodiment polymers that are useful in this invention as semi-amorphous polymers include homopolymers and random copolymers of propylene having a heat of fusion as determined by Differential Scanning Calorimetry (DSC) of less than 70 J/g, and or an MFR of 50 dg/min or less, and contains stereoregular propylene crystallinity preferably isotactic stereoregular propylene crystallinity. In another embodiment the polymer is a random copolymer of propylene and at least one comonomer selected from ethylene, $C_4$-$C_{12}$ α-olefins, and combinations thereof. Preferably the random copolymers of propylene comprises from 10 wt % to 25 wt % polymerized ethylene units, based on the total weight of the polymer; has a narrow intermolecular composition distribution (e.g. 75% or more); has a melting point (Tm) of from 25° C. to 120° C., or from 35° C. to 80° C.; has a heat of fusion within the range having an upper limit of 70 J/g or 25 J/g and a lower limit of 1 J/g or 3 J/g; has a molecular weight distribution Mw/Mn of from 1.8 to 4.5; and has a melt flow rate of 0.1 dg/min to 2000 dg/min (as measured at 230° C., and 2.16 kg, ASTM 1238).

A particularly preferred polymer useful in the present invention as a semi-amorphous polymer is an polymer with a moderate level of crystallinity due to stereoregular propylene sequences. The polymer can be: (A) a propylene homopolymer in which the stereoregularity is disrupted in some manner such as by regio-inversions; (B) a random propylene copolymer in which the propylene stereoregularity is disrupted at least in part by comonomers; or (C) a combination of (A) and (B).

In one embodiment, the useful polymers described above further include a non-conjugated diene monomer to aid in later chemical modification of the blend composition (such as crosslinking). The amount of diene present in the polymer is preferably less than 10% by weight, and more preferably less than 5% by weight. The diene may be any non-conjugated diene which is commonly used in ethylene propylene copolymers including, but not limited to, ethylidene norbornene, vinyl norbornene, and dicyclopentadiene.

The ethylene composition of these preferred semi-amorphous polymers can be measured as follows. A thin homogeneous film is pressed at a temperature of about 150° C. or greater, then mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt %=82.585−111.987X+ 30.045 $X^2$, wherein X is the ratio of the peak height at 1155 $cm^{-1}$ and peak height at either 722 $cm^{-1}$ or 732 $cm^{-1}$, whichever is higher.

In one embodiment, the semi-amorphous polymer is a random propylene copolymer having a narrow composition distribution. In another embodiment, the semi-amorphous polymer is a random propylene copolymer having a narrow composition distribution and a melting point of from 25° C. to 120° C., preferably 25° C. to 90° C. The copolymer is described as random because for a polymer comprising propylene, comonomer, and optionally diene, the number and distribution of comonomer residues is consistent with the random statistical polymerization of the monomers. In stereoblock structures, the number of block monomer residues of any one kind adjacent to one another is greater than predicted from a statistical distribution in random copolymers with a similar composition. Historical ethylene-propylene copolymers with stereoblock structure have a distribution of ethylene residues consistent with these blocky structures rather than a random statistical distribution of the monomer residues in the polymer. The intermolecular composition distribution (i.e., randomness) of the copolymer may be determined by $^{13}$C NMR, which locates the comonomer residues in relation to the neighboring propylene residues. The intermolecular composition distribution of the copolymer is determined by thermal fractionation in hexane as previously described.

In another embodiment, semi-amorphous polymers useful herein have a heat of fusion of 70 J/g or less, as determined by DSC described above, preferably from 1 to 65 J/g, preferably from 4 to 50 J/g, preferably from 10 to 45 J/g.

In another embodiment, semi-amorphous polymers useful herein have a weight average molecular weight of from 20,000 to 1,000,000, preferably from 50,000 to 500,000, preferably from 125,000 to 400,000 g/mol.

Preferred semi-amorphous polymers used in embodiments of the present invention have a propylene tacticity index (m/r) ranging from a lower limit of 4 or 6 to an upper limit of about 8, 10, or 12. The propylene tacticity index, expressed herein as "m/r", is determined by $^{13}$C nuclear magnetic resonance (NMR). The propylene tacticity index m/r is calculated as defined in H. N. Cheng, *Macromolecules*, 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 an atactic material, and an m/r ratio of greater than 1.0 an isotactic material. An isotactic material theoretically may have a ratio approaching infinity, and many by-product atactic polymers have sufficient isotactic content to result in ratios of greater than 50.

In a preferred embodiment, the preferred semi-amorphous polymers have isotactic stereoregular propylene crystallinity. The term "stereoregular" as used herein means that the predominant number, i.e. greater than 80%, of the propylene residues in the polypropylene exclusive of any other monomer such as ethylene, has the same 1,2 insertion and the stereochemical orientation of the pendant methyl groups is the same, either meso or racemic.

Preferred semi-amorphous polymers useful in this invention have a triad tacticity of three propylene units, as measured by $^{13}$C NMR, of 75% or greater, 80% or greater, 82% or greater, 85% or greater, or 90% or greater. The triad tacticity of a polymer is the relative tacticity of a sequence of three adjacent propylene units, a chain consisting of head to tail bonds, expressed as a binary combination of m and r sequences. It is usually expressed for semi-amorphous copolymers of the present invention as the ratio of the number of units of the specified tacticity to all of the propylene triads in the copolymer. The triad tacticity (mm fraction) of a propylene copolymer can be determined from a $^{13}$C NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

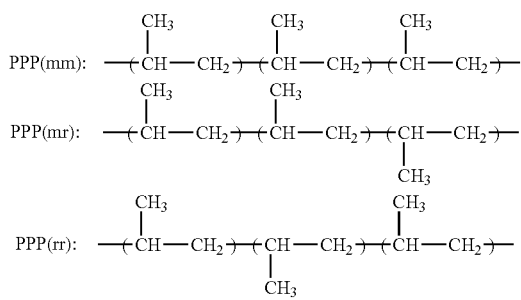

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

Preferred polymers useful as semi-amorphous copolymers in this invention are also those polymers described in detail as the "Second Polymer Component (SPC)" in WO 00/69963, WO 00/01766, WO 99/07788, WO 02/083753, and described in further detail as the "Propylene Olefin Copolymer" in WO 00/01745, all of which are fully incorporated by reference herein for purposes of U.S. patent practice.

Preferred semi-amorphous copolymers may be produced in a solution process using a metallocene catalyst as follows. In a preferred embodiment, a continuous solution polymerization process is used to produce copolymers of propylene and from 10 to 25 weight % ethylene preferably utilizing a metallocene catalyst, namely, 1,1'-bis(4-triethylsilylphenyl)methylene-(cyclopentadienyl)(2,7-di-tertiary-butyl-9-fluorenyl)hafnium dimethyl with dimethylaniliniumtetrakis-(pentafluorophenyl) borate as an activator. An organoaluminum compound, namely, tri-n-octylaluminum, may be added as a scavenger to the monomer feedstreams prior to introduction into the polymerization process. For preferred polymers, dimethylsilylbis(indenyl)hafnium dimethyl is used in combination with dimethylaniliniumtetrakis (pentafluorophenyl)borate. In other embodiments, dimethylsilyl bis(2-methyl-5-phenylindenyl)zirconium di alkyl (such as methyl) and or dimethylsilyl bis(2-methylindenyl) zirconium di alkyl (such as methyl) is used with an activator (dimethylaniliniumtetrakis(pentafluorophenyl)borate and or triaryl carbenium(pentafluorophenyl)borate). Preferably the solution polymerization is conducted in a single, or optionally in two, continuous stirred tank reactors connected in series with hexane used as the solvent. In addition, toluene may be added to increase the solubility of the co-catalyst. The feed is transferred to the first reactor at a reaction temperature between about 50° C. to about 220° C. Hydrogen gas may also be added to the reactors as a further molecular weight regulator. If desired, polymer product is then transferred to a second reactor, which is operated at a temperature between about 50° C. to 200° C. Additional monomers, solvent, metallocene catalyst, and activators can be fed to the second reactor.

Preferred semi-amorphous polymers may also be produced by the continuous solution polymerization process described in WO 02/34795, advantageously in a single reactor and separated by liquid phase separation from the alkane solvent. Preferred semi-amorphous polymers may also be produced by the polymerization process described at page 6 lines 24-57 of EP 1 003 814 B1.

Further detailed instructions on how to make such preferred semi-amorphous polymers can be found in WO 02/083754.

Preferred semi-amorphous polymers useful herein are made using a metallocene catalyst system.

Preferred semi-amorphous polymers include VM™1000, VM™2000, and VM™3000 available from ExxonMobil Chemical Company in Houston, Tex.

Blend Properties

In a preferred embodiment, the blend described herein is heterogeneous, characterized by a fine dispersion of the discontinuous phase (semi-amorphous polymer) uniformly distributed in the continuous phase or matrix (semi-crystalline polymer). The dimensions of the discontinuous phase depend on the compositions of the components and on the fabricating mode used to prepare the article. For example, injetion molding will introduce orientation along the flow direction causing some elongation of the dispersed phase particles.

In another embodiment, depending on the composition, the blend cold be heterogeneous with two phases, but the two phases could be co-continuous. In this case, it is not possible to definitively attribute one component to the matrix and the other to the dispersed phase, rather both components share the matrix.

The blends of the present invention can be prepared by any procedure that causes the intimate admixture of the components. This includes reactor blends, where the semi-crystalline polypropylene component is polymerized in one reactor (or one stage of one reactor) and the polymerized product is transferred to a different reactor or different stage of the same reactor, where polymerization of the semi-amorphous polymer occurs. The final blend product comprises an intimate mix of the two polymer components. Alternately, the blends can be prepared by post-reactor mixing of the semi-crystalline and semi-amorphous polymer components. For example, they may be blended in a tumbler, static mixer, batch mixer, extruder, or a combination thereof. The mixing step may take place as part of a processing method used to fabricate articles, such as in the extruder on an injection molding, machining or fiber line. Likewise, the components can be combined by melt pressing the components together on a Carver press to a thickness of 0.5 millimeter (20 mils) and a temperature of 180° C., rolling up the resulting slab, folding the ends together, and repeating the pressing, rolling, and folding operation 10 times. Internal mixers are particularly useful for solution or melt blending. Blending at a temperature of 180° C. to 240° C. in a Brabender Plastograph for 1 to 20 minutes has been found satisfactory. Still another method that may be used for admixing the components involves blending the polymers in a Banbury internal mixer above the flux temperature of all of the components, e.g., 180° C. for 5 minutes. A complete mixture of the polymeric components is indicated by the uniformity of the morphology of the dispersion of the semicrystalline polymer(s) and the semi-amorphous polymer(s). Continuous mixing may also be used. These processes are well known in the art and include single and twin screw mixing extruders, static mixers for mixing molten polymer streams of low viscosity, impingement mixers, as well as other machines and processes, designed to disperse the semi-crystalline polymer component and the semi-amorphous polymer component in intimate contact.

In a preferred embodiment the blend has dispersions of semi-amorphous polymer less than 4 mm in size inn a continuous phase of semi-crystalline polymer. Preferably the dispersions (or dispersed particles) are 3 mm or less, preferably 2 mm or less, preferably 1 mm or less. By dispersing less than 4 mm in size is meant that the average dispersive size is 4 mm or less.

The blends of the present invention preferably have a permanent tension set of 65% or more, preferably 85% or more, preferably 100% or more, preferably 125% or more, preferably 150% or more. Permanent tension set is measured according to the following procedure. Hysteresis testing is done on molded samples having the required dumbbell geometry (ASTM designation type I bars for polypropylene), using the following test procedure. The deformable zone (2.54 cm long section) of the sample is stretched to 200% of its original length at a deformation rate of 20 in/min (51 cm/min) in an Instron (The Instron Corporation, Canton, MA) testing machine. The sample is then allowed to relax while the machine retracts and comes back to the point where the stress is zero. The machine resets the new zero elongation point at this position. With the specimen still within the grips, the second cycle is then initiated for another 200% extension. Again, the machine is allowed to come back to the point where the stress is zero on the retraction cycle. The set for each cycle is determined with reference to their respective zero elongation points. Two specimens are tested for each sample. The average of the set values over the two cycles is taken as the permanent tension set.

The blends of the present invention preferably have a haze of 50% or less, preferably 40% or less, preferably 20% or less, preferably 15% or less, preferably 12% or less, preferably 10% or less, as measured by ASTM D 1003 on a 1 mm thick injection molded haze chip sample provided that the blend in question is combined with 2500 ppm of bis (3,4 dimethylbenzylidene)sorbitol (also called DMDBS and available as Millad 3988 from Milliken Chemicals) prior to being molded into the 1 mm chip. In a preferred embodiment, nucleating and or clarifying agent is present in the blend and the blend has a haze of 20% or less (as measured by ASTM D 1003 on a 1 mm thick injection molded haze chip sample.), preferably 18% or less, preferably 16% or less, preferably 14% or less, preferably 12% or less. While the Inventive blends are combined with a clarifying agent as described above for haze testing, the final articles of this invention may or may not contain clarifying or nucleating agent.

In another embodiment, the blends of the present invention preferably have a melt flow rate of 15 to 200 dg/min, preferably from 30 to 100 dg/min, preferably from 35 to 85 dg/min, preferably from 35 to 80 dg/min for spunbond nonwovens applications and a melt flow rate of 500 dg/min to 2000 dg/min, preferably 700 dg/min for melt blown nonwovens applications.

In another embodiment, the optimum bonding temperature of the heterogeneous blends of this invention is at least 5° C. lower than the optimum bonding temperature of the same blend, except that the semi-amorphous polymer is absent, preferably at least 10° C. lower, preferably at least 15° C. lower, preferably at least 20° C. lower, preferably at least 25° C. lower, preferably at least 30° C. lower.

In certain embodiments, the blends of the present invention may also comprise a third polymer component. The third polymer component may be added to the semi-crystalline polymer, the semi-amorphous polymer or the blend by methods well known in the art. In these embodiments, the third polymer component (TPC) comprises low density polyethylene (density 0.915 to less than 0.935 g/cm$^3$), linear low density polyethylene, ultra low density polyethylene (density 0.85 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), or combinations thereof. For example, polyethylene produced using a metallocene catalyst system (mPEs), i.e., ethylene homopolymers or copolymers may be employed. In a particular example, mPE homopolymers and copolymer are those produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Illustrative but not exclusive commercially products are available from ExxonMobil Chemical Company, Houston, Tex., under the tradenames EXCEED™ and EXACT™ among others well known in the industry. Blends where the third component is a propylene polymer or copolymer, an EP or EPDM copolymer rubber, another polyolefin (e.g. EVA, ethylene vinyl acetate) are also envisioned.

The blends of this invention may also comprise other ingredients. For example the blends of this invention may comprise nucleating agents, preferably present at 50 to 4000 ppm based on total polymer in the blend composition. Preferred nucleating agents include: Hyperform (e.g. HPN-68 and Millad additives (e.g. Millad 3988) from Milliken Chemicals, Spartanburg, S.C. and organophosphates like NA-11 and NA-21 from Amfine Chemicals, Allendale, N.J.

Further, a variety of additives may be incorporated into the embodiments described above used to make the blends, fibers, and fabrics for various purposes. Such additives include, for example, stabilizers, antioxidants, fillers, colorants, nucleating agents and slip additives. Primary and secondary antioxidants include, for example, hindered phenols, hindered amines, and phosphites. Nucleating agents include, for example, sodium benzoate and talc. Also, other nucleating agents may also be employed such as Ziegler-Natta olefin product or other highly crystalline polymer. Other additives such as dispersing agents, for example, Acrowax C, can also be included. Catalyst deactivators are also commonly used, for example, calcium stearate, hydrotalcite, and calcium oxide, and/or other acid neutralizers known in the art.

Other additives include, for example, fire/flame retardants, plasticizers, vulcanizing or curative agents, vulcanizing or curative accelerators, cure retarders, processing aids, tackifying resins, and the like. The aforementioned additives may also include fillers and/or reinforcing materials, either added independently or incorporated into an additive. Examples include carbon black, clay, talc, calcium carbonate, mica, silica, silicate, combinations thereof, and the like. Other additives which may be employed to enhance properties include antiblocking agents, lubricants, and nucleating agents. The lists described herein are not intended to be inclusive of all types of additives which may be employed with the present invention. Upon reading this disclosure, those of skilled in the art will appreciate other additives may be employed to enhance properties. As is understood by the skilled in the art, the blends of the present invention may be modified to adjust the characteristics of the blends as desired.

Process oils can also be optimally added to the embodiments described above. The blend may include process oil in the range of from 1 to 50, alternatively in the range of from 2 to 20 parts by weight of process oil per hundred parts of total polymer components. The addition of process oil in moderate amounts lowers the viscosity and stiffness of the blend while improving the properties of the blend at temperatures near and below 0° C. It is believed that these benefits arise by the lowering of the Tg of the blend. Additional benefits of adding process oil to the blend include improved processibilty and a better balance of elastic and tensile strength. The process oils typically consist of (a) hydrocarbons consisting essentially of carbon and hydrogen with traces of hetero atoms such as oxygen or (b) essentially of carbon, hydrogen and at least one hetero atom such as dioctyl phthalate, ethers and polyethers. Preferred process oils have a high boiling point to be substantially involatile at 200° C. Such process oils are commonly available either as neat solids or liquids or as physically absorbed mixtures of these materials on an inert support (e.g. clays, silica) to form a free flowing powder. Other useful process oils include a mixture of a large number of chemical compounds which may consist of linear, acyclic but branched, cyclic and aromatic carbonaceous structures. Another family of useful process oils are certain low to medium molecular weight (Molecular weight ($M_n$)<10,000) organic esters and alkyl ether esters. Examples of process oils are Sunpar™ 150 and 220 from The Sun Manufacturing Company of Marcus Hook, Pa. USA and Hyprene™ V750 and Hyprene™ V1200 from Ergon, in Jackson, Miss. and IRM 903 from Calumet Lubricants Company in Princeton, La. It is also anticipated that combinations of process oils each of which is described above may be used in the practice of the invention. In certain embodiments, it is important that in the selection the process oil be compatible or miscible with the blend composition in the melt to form a homogenous one phase blend, although two phase blends and multi-phase blends are also contemplated. The addition of the process oils to the blend or blend polymer components maybe made by any of the conventional means known to the art.

The addition of certain process oils to lower the glass transition temperature of the blends of isotactic polypropylene and ethylene propylene diene rubber has been described in the art by Ellul in U.S. Pat. Nos. 5,290,886 and 5,397,832. These procedures are easily applicable to the current invention.

In certain embodiments the components as well as the blends may include various amounts of plasticizer(s). In one embodiment, the plasticizer comprises $C_6$ to $C_{200}$ paraffins, and $C_8$ to $C_{100}$ paraffins in another embodiment. In another embodiment, the plasticizer consists essentially of $C_6$ to $C_{200}$ paraffins, and consists essentially of $C_8$ to $C_{100}$ paraffins in another embodiment. For purposes of the present invention and description herein, the term "paraffin" includes all isomers such as n-paraffins, branched paraffins, isoparaffins, and may include cyclic aliphatic species, and blends thereof, and may be derived synthetically by means known in the art, or from refined crude oil. Suitable plasticizers also include "isoparaffins", "polyalphaolefins" (PAOs) and "polybutenes" (a subgroup of PAOs). These three classes of compounds can be described as paraffins which can include branched, cyclic, and normal structures, and blends thereof. They can be described as comprising $C_6$ to $C_{200}$ paraffins in one embodiment, and $C_8$ to $C_{100}$ paraffins in another embodiment. Preferred plasticizers include those described in WO 2004/014998 (which is incorporated by reference herein), particularly those plasticizers described at page 9, line 31 to page 26, line 19. Preferred poly-alpha-olefins (PAO's) useful in this invention include those described in WO 2004/014998, particularly those described at page 17, line 19 to page 19, line 25. Likewise Group III Basestocks may be used as plasticizers herein. Preferred Group III Basestocks include those described in WO 2004/014998, particularly those Group III Basestocks which are severely hydrotreated mineral oils having a saturates levels of 90% or more, preferably 92% or more, preferably 94% or more, preferably 95% or more, and sulfur contents less than 0.03%, preferably between 0.001 and 0.01%, and VI is in excess of 120, preferably 130 or more. Preferably the Group III hydrocarbon base stock has a kinematic viscosity at 100° C. of 3 to 100, preferably 4 to 100 cSt, preferably 6 to 50 cSt, preferably 8 to 20; and/or a number average molecular weight of 300 to 5,000, preferably 400 to 2,000, more preferably 500 to 1,000; and/or a carbon number of 20 to 400, preferably 25 to 400, preferably 35 to 150, more preferably 40 to 100. The plasticizer may be present in the blends of the invention from 0.1 wt % to 60 wt % in one embodiment (based upon the weight of the blend, respectively), and from 0.5 wt % to 40 wt % in another embodiment, and from 1 wt % to 20 wt % in yet another embodiment, and from 2 wt % to 10 wt % in yet another embodiment, wherein a desirable range may comprise any upper wt % limit with any lower wt % limit described herein.

Nonwovens

As used herein, the Peak Force and Peak Elongation of a fiber or nonwoven sample, (including a fabric) are measured according to the ASTM test D-5035-95 (2003) with four modifications: 1) the jaw width is 5 in instead of 3 in, 2) test speed is 5 in/min instead of 12 in/min, 3) metallic arc-type upper line grip and a flat lower rubber grip are used instead of a flat metallic upper and a flat metallic lower grip, and 4) 6 MD and 6 TD measurements instead of 5 MD and 8 TD measurements are made for each specimen. This test measures the strength in pounds and elongation in percent of a fabric.

The blends of this invention may be formed into fibers and nonwovens. The formation of nonwoven fabrics from polyolefins and their blends generally requires the manufacture of fibers by extrusion followed by weaving or bonding. The extrusion process is typically accompanied by mechanical or aerodynamic drawing of the fibers. The fabric of the present invention may be manufactured by any technique known in the art. Such methods and equipment are well known. For example, spunbond nonwoven fabrics may be produced by spunbond nonwoven production lines produced by Reifenhauser GmbH & Co., of Troisdorf, Germany. The Reifenhasuer system utilizes a slot drawing technique as revealed in U.S. Pat. No. 4,820,142. Fabrics of the present invention demonstrate desirable stiffness and enhanced softness. Specific embodiments are described as follows.

Conventional Fine Denier Fibers: The three more conventional fiber operations, continuous filament, bulked continuous filament, and staple, are contemplated as application for the fibers of the present invention. For example, the polymer melt is extruded through the holes in the die (spinneret) between, 0.3 mm to 0.8 mm in diameter. Low melt viscosity of the polymer is important and is achieved through the use of high melt temperature (230° C. to 280° C.) and high melt flow rates (15 g/10 min to 40 g/10 min) of the polymers used. A relatively large extruder is usually equipped with a manifold to distribute a high output of molten PP to a bank of eight to twenty spinheads. Each spinhead is usually equipped with a separate gear pump to regulate output through that spinhead; a filter pack, supported by a "breaker plate;" and the spinneret plate within the head. The number of holes in the spinneret plate determines the number of filaments in a yarn and varies considerably with the different yarn constructions, but it is typically in the range of 50 to 800. The holes are typically grouped into round, annular, or rectangular patterns to assist in good distribution of the quench air flow.

Continuous Filament: Continuous filament yarns typically range from 40 denier to 2,000 denier (denier=number of grams/9000 yd). Filaments can range from 1 to 20 denier per filament (dpf), and the range is growing. Spinning speeds are typically 800 m/min to 5000 m/min (2500 ft/min to 16400 ft/min). An exemplary method would proceed as follows. The filaments are drawn at draw ratios of 3:1 or more (one- or two-stage draw) and wound onto a package. Spinning speeds in excess of 900 m/min (3000 ft/min) require a narrow MWD to get the best spinnability with the finer filaments. Resins with a minimum MFR of 5 and a NMWD, with a polydispersity index (PI) under 2.8 are typical. In slower spinning processes, or in heavier denier filaments, a 16-MFR reactor grade product may be more appropriate.

Partially Oriented Yarn (POY): Partially oriented yarn (POY) is the fiber produced directly from fiber spinning without second stage drawing (as continuous filament mentioned above). The orientation of the molecules in the fiber is done only in the melt state just after the molten polymer leaves the spinnerett. Once the fiber is solidified, no drawing of the fiber takes place and the fiber is wounded up into a package. The POY yarn (as opposed to fully oriented yarn, or FOY, which has gone through multiple stage orientation and has a higher tensile strength and lower elongation) tends to have a higher elongation and lower tenacity.

Bulked Continuous Filament: Bulked Continuous Filament fabrication processes fall into two basic types, one-step and two steps. For example, in a two-step process, an undrawn yarn is spun at less than 1,000 m/min (3,300 ft/min), usually 750 m/min, and placed on a package. The yarn is drawn (usually in two stages) and "bulked" on a machine called a texturizer. Winding and drawing speeds are limited by the bulking or texturizing device to 2,500 m/min (8,200 ft/min) or less. As in the two-step CF process, secondary crystallization requires prompt draw texturizing. The most common process today is the one-step spin/draw/texturing (SDT) process. This process provides better economics, efficiency and quality than the two-step process. It is similar to the one-step CF process, except that the bulking device is in-line. Bulk or texture changes yarn appearance, separating filaments and adding enough gentle bends and folds to make the yarn appear fatter (bulkier).

Staple Fiber: Nonwoven fabrics are also frequently made starting from staple fibers. These shortcut fibers are separated and then carded, or "combed" into a web by passing through rotating cylinders covered by wires with teeth. The unbonded web of fibers is subsequently consolidated using various techniques—with heat and pressure from a calender (thermal bonding), by adding chemical binders (chemical or resin bonding), by hydroentangling with water jets (spunlaced or hydroentangling), by laying a slurry of the fibers on a screen followed by squeezing the web between rolls and drying in an oven (wet laid), by processing the web through a hot air oven (airlaid or thru-airbonded), or by inserting barbed needles mechanically into the substrate, hooking tufts of fibers and entangling them (needle punched). The process typically involves two steps: 1) producing, applying finish, and winding followed by 2) drawing, a secondary finish application, crimping, heat setting and cutting into staple. Filaments can range, for example, from 1.5 dpf to >70 dpf, depending on the application. Staple length can be as short as 7 mm or as long as 200 mm (0.25 in. to 8 in.) to suit the application. For many applications the fibers are crimped. Crimping is accomplished by over-feeding the tow into a steam-heated stuffer box with a pair of nip rolls. The over-feed folds the tow in the box, forming bends or crimps in the filaments. These bends are heat-set by steam injected into the box. The MW, MWD, and isotactic content of the resin all affect crimp stability, amplitude, and ease of crimping.

Melt Blown Fabrics: Melt blown fabrics generally refer to webs of fine filaments having fiber diameter in the range of 20 to 0.1 microns. Typical fiber diameters are in the range of 1 to 10 microns and more typically in 1 to 5 microns. The nonwoven webs formed by these fine fiber diameters have very small pore sizes and therefore have excellent barrier properties. For example, in the melt blown process, the extruder melts the polymer and delivers it to a metering melt pump. The melt pump delivers the molten polymer at a steady output rate to the special melt blowing die. As the molten polymer exits the die, they are contacted by high temperature, high velocity air (called process or primary air). This air rapidly draws and, in combination with the quench air, solidifies the filaments. The entire fiber forming process typically takes place within several inches of the die. Die design is the key to producing a quality product efficiently. The fabric is formed by blowing the filaments directly onto a porous forming belt, typically 200 mm to 400 mm (8 in. to 15 in.) from the spinnerets. A larger forming distance may be used for heavier basis weight, higher loft product. Melt blowing requires very high melt flow rate resin typically >200 g/10 min, to obtain the finest possible fibers, although resin MFR as low as 20 g/10 min can be used at a higher processing temperature in other embodiments.

Spunbonded Fabric: Spunbond or spunbonded fibers generally refer to fibers produced, for example, by the extrusion of molten polymer from either a large spinneret having several thousand holes or with banks of smaller spinnerets, for example, containing as few as 40 holes. After exiting the spinneret, the molten fibers are quenched by a cross-flow air quench system, then pulled away from the spinneret and attenuated (drawn) by high speed air. There are generally two methods of air attenuation, both of which use the venturi effect. The first draws the filament using an aspirator slot (slot draw), which runs the width of the spinneret or the width of the machine. The second method draws the filaments through a nozzle or aspirator gun. Filaments formed in this manner are collected on a screen ("wire") or porous forming belt to form the web. The web is then passed through compression rolls and then between heated calender rolls where the raised lands on one roll bond the web at points covering 10% to 40% of its area to form a nonwoven fabric. More information on the spunbond process in general can be obtained from Wadsworth, L. C. and Goswami, B. C., Nonwoven Fabrics: "Spunbonded and Melt Blown Processes", Proceedings of the Eighth Annual Nonwovens Workshop, July 30 to Aug. 3, 1990, sponsored by TANDEC, University of Tennessee at Knoxyille.

Annealing may be done after the formation of fiber in continuous filament or fabrication of a nonwoven material from the fibers. Annealing partially relieves the internal stress in the stretched fiber and restores the elastic recovery properties of the fiber. Annealing has been shown to lead to significant changes in the internal organization of the crystalline structure and the relative ordering of the amorphous and crystalline phases. Thermal annealing of the polymer blend is conducted by maintaining the polymer blends or the articles made from a such a blend at temperature, for example, between room temperature to a maximum of 160° C. or alternatively to a maximum of 130° C. for a period between a few seconds to less than 1 hour. A typical annealing period is 1 to 5 min. at 100° C. The annealing time and temperature can be adjusted for any particular blend. The annealing temperature can range from 60° C. to 130° C. For conventional continuous fiber spinning, annealing can be done by passing the fiber through a heated roll (godet), without the application of conventional annealing techniques. Annealing should be conducted under very low fiber tension to allow for shrinking of the fiber. In nonwoven processes, the web usually passes through a calender to point bond (consolidate) the web. The passage of the unconsolidated nonwoven web through a heated calender at relatively high temperature is sufficient to anneal the fiber and the nonwoven web. Similar to fiber annealing, the nonwoven web should be under low tension to allow for shrinkage of the web in both machine direction (MD) and transverse direction (TD). The annealing temperature can be adjusted for any particular blend.

In other embodiments, the nonwoven fabrics of the present invention require little to no post fabrication processing. In another embodiment, the fabrics of the present invention are annealed in a single-step by a heated roll (godet) during calendering under low tension.

In a preferred embodiment, this invention relates to nonwoven articles formed from one or more of the blends above where the blend has a permanent set of greater than 65%, and when the blend is formed into a nonwoven, where the nonwoven has: a Hand of 40 g or less (at 35 gsm basis weight), an optimum bonding temperature at least 10 F (~5 C) lower than a similar nonwoven made from the same composition but where the semi-amorphous propylene-ethylene copolymer component of the blend is absent, and adequate fabric formation (ie. uniformity of distribution of fibers that form the fabric) and nonwoven processing (ie. the ability to maintain commercially competitive output rates characteristic of propylene homopolymers and copolymers used in the industry today).

As used herein, the softness of a nonwoven fabric is measured according to the "Handle-O-Meter" test as specified in operating manual on Handle-O-Meter model number 211-5 from the Thwing-Albert Instrument Co., 10960 Dutton Road, Phila., Pa., 19154. The Handle-O-Meter reading is in units of grams. The modifications are: 1. Two specimens per sample were used and 2. Readings are kept below 100 gram by adjusting the slot width used and the same slot width is used through out the whole series of samples being compared, preferably 10 mm. The lower the Hand value, the softer and more aesthetically pleasing the fabric and the better the drapeability of the fabric, features more generally associated with cloth than with plastic polypropylene fabrics. Soft fabrics are highly desired in many applications, particularly in hygiene and other similar consumer applications and medical applications, where contact with the human body is involved. In a preferred embodiment, the nonwovens of this invention have a Hand (for 35 gsm basis weight fabrics) of 35 g or less, preferably 25 g or less, more preferably 15 g or less.

In another embodiment, nonwoven articles made from the compositions of this invention (preferably where the semi-amorphous polymer comprises from 10 to 20 weight % comonomer (preferably 12 to 20 weight % comonomer) and is present at from 20 to 40 weight %), preferably have at 35 g/sq m a hand value of 10 to 30 g, a transverse direction peak force greater than 5 g, a machine direction tear strength greater than 500 g, and an optimum bonding temperature 5° C. to 40° C. lower than that of the same article made from the same composition except that the semi-amorphous polymer is absent.

Fabric tensile properties, including Transverse direction peak force, Machine direction peak force and properties based on fabric tensile properties like Optimum bonding temperature were measured according to ASTM standard D5035-95(2003). A gauge length of 5 in (12.7 cm) and a crosshead speed of 5 in/min (12.7 cm/min) were used. Six 1 inch (2.54 cm) wide strips of fabric were cut in both the machine direction and transverse direction of the spunbond web for testing. The values reported were averages over the six sample measurements. Machine direction tear strength was measured according to ASTM standard D-5734-95.

In addition to the soft hand, good fabric formation, easy runnability on commercial nonwoven equipment, and a lowering of the optimum bonding temperature, the blend fabrics also display satisfactory tensile properties and tear resistance.

In a preferred embodiment the blends and nonwovens of this invention are useful in packaging materials, packages, nonwoven web, fabrics, surgical gown or drapes, clothing, diapers. In a preferred embodiment, particularly medical applications such as gowns, drapes and bandges, the articles may comprise a bactericidal agent. In another embodiment, the blends and nonwovens of this invention are useful in articles selected from the group consisting of: nonwoven fabrics, hook and loop fasteners, fabrics, garments, clothing, medical garments, surgical gowns, surgical drapes, diapers, training pants, sanitary napkins, panty liners, incontinent wear, bed pads, bags, packaging material, packages, swimwear, body fluid impermeable backsheets, body fluid impermeable layers, body fluid permeable layers, body fluid permeable covers, absorbents, tissues, nonwoven composites, liners, cloth linings, scrubbing pads, face masks, respirators, air filters, vacuum bags, oil and chemical spill sorbents, thermal insulation, first aid dressings, medical wraps, fiberfill, outerwear, bed quilt stuffing, furniture padding, filter media, scrubbing pads, wipe materials, hosiery, automotive seats, upholstered furniture, carpets, carpet backing, filter media, disposable wipes, diaper coverstock, gardening fabric, geomembranes, geotextiles, sacks, housewrap, vapor barriers, breathable clothing, envelopes, tamper evident fabrics, protective packaging, and coasters.

In another embodiment, this invention relates to:

1. A nonwoven article comprising a heterogeneous blend comprising:

1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 2000 dg/min or less; and 2) from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and or C4 to C10 alpha-olefin comonomers, said semi-amorphous polymers each having:

a) heat of fusion of 4 to 70 J/g;
   b) a Melt Flow Rate of 0.1 to 2000 dg/min;
   c) an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
   d) an Mw/Mn of 1.5 to 4, and
   e) a propylene triad tacticity, as measured by $^{13}$C NMR, of 75% or greater; where the blend of the semi-crystalline and semi-amorphous polymers comprises less than 5 weight % filler, based upon the weight of the polymers and the filler, and the blend has:
   i) an MFR greater than 30 dg/min; and
   ii) a Permanent Set of greater than 65% (as measured on a 125 mil thick molded part); and where the nonwoven article has a Hand of 40 g or less at a weight of 35 gsm.

2. The article of paragraph 1 wherein the semi-crystalline polymer comprises propylene and from 1 to 3 weight % of a C2 to C10 alpha olefin comonomer, preferably where the alpha-olefin comonomer is selected from the group consisting of ethylene, butene, pentene, hexene, heptene, octene, nonene, and decene, preferably select the group consisting of ethylene, butene, hexene, and octene, preferably the alpha-olefin comonomer is ethylene.

3. The article of paragraph 1 or 2 wherein the semi-crystalline polymer comprises 0 weight % comonomer.

4. The article of paragraph 1, 2 or 3 wherein the semi-crystalline polymer has a melting point of 120 to 165° C. and or a flexural modulus of between 1030 and 2070 MPa.

5. The article of paragraph 1, 2, 3, or 4 wherein the semi-amorphous polymer comprises propylene and from 12 to 20 weight % of a C2 to $C_{10}$ alpha olefin comonomer, preferably selected from the group consisting of ethylene, butene, pentene, hexene, heptene, octene, nonene, and decene, preferably selected from the group consisting of ethylene, butene, hexene, and octene, preferably ethylene.

6. The article of paragraph 1, 2, 3, 4, or 5 wherein the semi-amorphous polymer has a percent crystallinity of between 2 and 25% and or a Mooney viscosity (1+4@125° C.) of 3 or more, and or a melt flow rate of 5 to 2000 dg/min, preferably 20 to 1750 dg/min.

7. The article of paragraph 1, 2, 3, 4, 5, or 6 wherein the heterogeneous blend has a heat deflection temperature of 40° C. or more as measured under 1.8 MPa of pressure and or a haze of 50% or less as measured on a 1 mm thick chip.

8. The article of paragraph 1, 2, 3, 4, 5, 6, or 7 wherein the blend further comprises a nucleating and or clarifying agent and preferably has a haze of 20% or less as measured on a 1 mm thick chip, preferably 18% or less, preferably 16% or less, preferably 14% or less, preferably 12% or less.

9. The article of paragraph 1, 2, 3, 4, 5, 6, 7, or 8 wherein the optimum bonding temperature of the heterogeneous blend is at least 5° C. lower than the optimum bonding temperature of the same blend, except that the semi-amorphous polymer is absent, preferably at least 1° C. lower, preferably at least 15° C. lower, preferably at least 20° C. lower, preferably at least 25° C. lower, preferably at least 30° C. lower.

10. The article of paragraph 1, 2, 3, 4, 5, 6, 7, 8, or 9 wherein the blend has a permanent set of 85% or more, preferably 100% or more, preferably 125% or more, preferably 150% or more.

11. The article of paragraph 1, 2, 3, 4, 5, 6, 7, 8, 9, or 10 wherein the nonwoven article has a weight of 35 gsm or more, has a TD Peak Tensile load at optimum bonding of at least 10% greater than the TD Peak Tensile load of the same blend except that the semi-amorphous polymer is absent, and has a TD Peak Tensile load at least 25% greater than the TD Peak Tensile load of the same blend except that the semi-amorphous polymer is absent.

12. The article of paragraph 1, 2, 3, 4, 5, 6, 7, 8, 9, 10, or 11 wherein the semi-amorphous polymer comprises from 12 to 20 weight % comonomer and is present at from 20 to 40 weight %, and wherein the article at 35 g/sq m has a hand value of 10 to 30 g, a transverse direction peak force at optimum boding temperature greater than 5 g, a machine direction tear strength greater than 500 g, and an optimum bonding temperature 5° C. to 40° C. lower than that of the same article made from the same composition except that the semi-amorphous polymer is absent.

13. The article of paragraph 1, 2, 3, 4, 5, 6, 7, 8, 9, 10, 11, or 12 wherein the semi-crystalline polymer has a melting point of 120 to 160° C. and a flexural modulus of 1030 to 2070 MPa; and the semi-amorphous polymer comprises 5 to 20 weight % comonomer, has a percent crystallinity of 10 to 25% and has a Mooney viscosity (1+4@125° C.) of 3 or more.

14. The article of paragraph 1, 2, 3, 4, 5, 6, 7, 8, 9, 10, 11, 12, or 13 wherein the heterogeneous blend further comprises a slip agent.

15. The article of paragraph 1, 2, 3, 4, 5, 6, 7, 8, 9, 10, 11, 12, or 13 wherein the heterogeneous blend further comprises from 50 ppm to 10 weight % of a slip agent, based upon the weight of the heterogeneous blend.

16. The article of paragraph 14 or 15 wherein the slip agent is selected from the group consisting of amides having the chemical structure $CH_3(CH_2)_7CH=CH(CH_2)_xCONH_2$ where x is 5 to 15.

17. The article of paragraph 14, 15 or 16 wherein the slip agent is selected from the group consisting of: erucamide, oleylamide, oleamide, and stearamide.

18. The article of paragraph 1, 2, 3, 4, 5, 6, 7, 8, 9, 10, 11, 12, 13, 14, 15, 16, or 17 wherein the heterogeneous blend further comprises from 50 ppm to 4000 ppm of a nucleating agent, based upon the weight of the total polymer present in the heterogeneous blend.

19. The article of paragraph 1, 2, 3, 4, 5, 6, 7, 8, 9, 10, 11, 12, 13, 14, 15, 16, 17, or 18 wherein the article is packaging material, a package, a nonwoven web, a fabric. A spunbonded nonwoven, a meltblown nonwoven, a surgical gown or drape, clothing, a diaper.

20. The article of paragraph 1, 2, 3, 4, 5, 6, 7, 8, 9, 10, 11, 12, 13, 14, 15, 16, 17, 18, or 19 where the article comprises a bactericidal agent.

21. The article of paragraph 1, 2, 3, 4, 5, 6, 7, 8, 9, 10, 11, 12, 13, 14, 15, 16, 17, 18, 19, or 20 where the article is selected from the group consisting of: nonwoven fabrics, hook and loop fasteners, fabrics, garments, clothing, medical garments, surgical gowns, surgical drapes, diapers, training pants, sanitary napkins, panty liners, incontinent wear, bed pads, bags, packaging material, packages, swimwear, body fluid impermeable backsheets, body fluid impermeable layers, body fluid permeable layers, body fluid permeable covers, absorbents, tissues, nonwoven composites, liners, cloth linings, scrubbing pads, face masks, respirators, air filters, vacuum bags, oil and chemical spill sorbents, thermal insulation, first aid dressings, medical wraps, fiberfill, outerwear, bed quilt stuffing, furniture padding, filter media, scrubbing pads, wipe materials, hosiery, automotive seats, upholstered furniture, carpets, carpet backing, filter media, disposable wipes, diaper coverstock, gardening fabric, geomembranes, geotextiles, sacks, housewrap, vaopr barriers, breathable clothing, envelops, tamper evident fabrics, protective packaging, and coasters.

22. The article of paragraph 1, 2, 3, 4, 5, 6, 7, 8, 9, 10, 11, 12, 13, 14, 15, 16, 17, 18, 19, 20, or 21 wherein the heterogeneous blend has a continuous phase comprising the semi-crystalline polymer.

23. The article of paragraph 1, 2, 3, 4, 5, 6, 7, 8, 9, 10, 11, 12, 13, 14, 15, 16, 17, 18, 19, 20, 21, or 22 wherein the heterogeneous blend has a discontinuous phase comprising the semi-amorphous polymer.

24. The article of paragraph 1, 2, 3, 4, 5, 6, 7, 8, 9, 10, 11, 12, 13, 14, 15, 16, 17, 18, 19, 20, or 21 wherein the heterogeneous blend has co-continuous phases of the semi-crystalline polymer and the semi-amorphous polymer.

25. The article of any of paragraphs 1 to 24 wherein the blend is formed into staple fibers prior to being formed into the non-woven article.

26. The article of paragraph 25 wherein the staple fiber is crimped.

27. The fiber of paragraph 57 wherein the staple fiber is 7 to 200 mm long.

28. A process to produce the nonwoven article of any of paragraphs 1 to 27, the process comprising:

1) blending a first component comprising from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 2000 dg/min or less; and from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and or C4 to C10 alpha-olefin comonomers, said semi-amorphous polymers each having:

a) heat of fusion of 4 to 70 J/g;

b) a Melt Flow Rate of 0.1 to 2000 dg/min;

c) an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and d) an Mw/Mn of 1.5 to 4, and e) a propylene triad tacticity, as measured by $^{13}$C NMR, of 75% or greater; where the blend of the semi-crystalline and semi-amorphous polymers comprises less than 5 weight % filler, based upon the weight of the polymers and the filler, and the blend has:

i) an MFR greater than 30 dg/min; and ii) a Permanent Set of greater than 65% (as measured on a 125 mil thick molded part); and 2) optionally extruding the blend composition to produce, finish, and wind a filament, then draw, finish, crimp, heat set and cut the filament into a staple fiber; and 3) optionally forming the staple fiber into a non-woven fabric, where the nonwoven article has a Hand of 40 g or less at a weight of 35 gsm.

29. The process of paragraph 28 wherein the staple fiber is 7 to 200 mm long.

30. A process to produce the nonwoven article of any of claims 1 to 27, the process comprising:

1) blending a first component comprising from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 2000 dg/min or less; with from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and or C4 to C10 alpha-olefin comonomers, said semi-amorphous polymers each having:

a) heat of fusion of 4 to 70 J/g;

b) a Melt Flow Rate of 0.1 to 2000 dg/min;

c) an Mw/Mn of 1.5 to 4, and d) a propylene triad tacticity, as measured by $^{13}$C NMR, of 75% or greater; where the blend of the semi-crystalline and semi-amorphous polymers comprises less than 5 weight % filler, based upon the weight of the polymers and the filler, and the blend has:

i) an MFR greater than 30 dg/min; and ii) a Permanent Set of greater than 65% (as measured on a 125 mil thick molded part); and 2) optionally extruding the blend composition to produce, finish, and wind a filament, then draw, finish, crimp, heat set and cut the filament into a staple fiber; and 3) optionally forming the staple fiber into a non-woven fabric, where the nonwoven article has a Hand of 40 g or less at a weight of 35 gsm.

31. The process of paragraph 31 wherein the staple fiber is 7 to 200 mm long.

32. The process of any of the above paragraphs 1 to 31 wherein the intermolecular compositional distribution of the semi-amorphous polymer is such that 90% by weight or more of the polymer is isolated as one or two adjacent, soluble fractions with the balance of the polymer in immediately preceding or succeeding fractions; and wherein each of these fractions has a wt % comonomer content with a difference of no greater than 10 wt % relative to the average wt % comonomer content of the copolymer.

EXAMPLES

Example 1

Copolymerization to Form the Semi-Amorphous Propylene-Ethylene Copolymers (SAPEC)

Continuous polymerization was conducted in a 9 liter continuous flow stirred tank reactor using hexane as the solvent. The liquid full reactor had a residence time of 9 minutes and the pressure was maintained at 700 kPa. A mixed feed of hexane, ethylene and propylene was pre-chilled to approximately −30° C. to remove the heat of polymerization, before entering the reactor. A solution of catalyst/activator in toluene and the scavenger in hexane were separately and continuously admitted into the reactor to initiate the polymerization. The reactor temperature was maintained between 35 and 50° C., depending on the target molecular weight. The feed temperature was varied, depending on the polymerization rate to maintain a constant reactor temperature. The polymerization rate was varied from 0.5 kg/hr to 4 kg/hr. Hexane at 30 kg/hr was mixed with ethylene at 717 g/hr and propylene at 5.14 kg/hr and fed to the reactor. The polymerization catalyst, dimethyl silyl bis-indenyl hafnium dimethyl activated in a 1:1 molar ratio with N',N'-dimethyl anilinium-tetrakis (pentafluorophenyl)borate was introduced at the rate of 0.0135 g/hr. A dilute solution of triisobutyl aluminum was introduced into the reactor as a scavenger of catalyst terminators at a rate of approximately 111 mole of scavenger per mole of catalyst. After five residence times of steady polymerization, a representative sample of the polymer produced in this polymerization was collected. The solution of the polymer was withdrawn from the top and then steam distilled to isolate the polymer. The polymerization rate was measured at 3.7 kg/hr. The polymer produced in this polymerization had an ethylene content of 14%, Mooney viscosity [ML (1+4) at 125° C. by ASTM D-1646] of 13.1 and had isotactic propylene sequences. Variations in the composition of the polymer were obtained principally by changing the ratio of ethylene to propylene. Molecular weight of the polymer was varied by either changing the reactor temperature or by changing the ratio of total monomer feed rate to the polymerization rate. Dienes for terpolymerization were added to the mixed feed stream entering the reactor by preparing the diene in a hexane solution and metering it in the required volumetric amount.

In the manner described in Example 1 above, several semi-amorphous propylene-ethylene copolymers (SAPEC) were synthesized. These are described in Table 1. Samples SAPEC-1 and 2 were utilized to prepare the blends used to fabricate the nonwoven articles.

TABLE 1

Characterization of Semi-Amorphous Propylene-Ethylene Copolymers

| SAPEC | ML(1 + 4) at 125 C. | Mw[#] | Mn[#] | Mz[#] | Ethylene Wt %* | Tm dsc ° C. | ΔH melt J/g |
|---|---|---|---|---|---|---|---|
| SAPEC-1 | 2.5** | 227111 | 130615 | 349440 | 14.9 | 50.9 | 14.6 |
| SAPEC-2 | 2.2** | 247620 | 139049 | 388319 | 16.2 | 51.5 | 9.8 |
| SAPEC-3 | 14 | 248900 | 102000 | | 7.3 | 84.7 | |
| SAPEC-4 | 23.9 | 265900 | 124700 | | 11.6 | 43.0 | |
| SAPEC-5 | 33.1 | 318900 | 121900 | | 16.4 | 42.2 | |
| SAPEC-6 | 34.5 | | | | 11.1 | 63.4 | |
| SAPEC-7 | 38.4 | | | | 14.7 | 47.8 | |

**MFR values (dg/min) by ASTM D-1238 Cond L
[#]GPC data in daltons
*Ethylene wt % measured by IR procedure described earlier.

Crystallization temperature (Tc), melting temperature ($T_m$) and heat of fusion (Hf, ΔH, or ΔHf) were measured using Differential Scanning Calorimetry (DSC). This analysis was conducted using either a TA Instruments MDSC 2920 or a Perkin Elmer DSC7. Typically, 6 to 10 mg of molded polymer or plasticized polymer was sealed in an aluminum pan and loaded into the instrument at room temperature. Melting data (first heat) were acquired by heating the sample to at least 30° C. above its melting temperature at a heating rate of 110° C./min. This provides information on the melting behavior under as-molded conditions, which can be influenced by thermal history as well as any molded-in orientation or stresses. The sample was then held for 10 minutes at this temperature to destroy its thermal history. Crystallization data was acquired by cooling the sample from the melt to at least 50° C. below the crystallization temperature at a cooling rate of 10° C./min. Typically, the blend samples were cooled down to −25 C. The sample was then held at this temperature for 10 minutes, and finally heated at 10° C./min to acquire additional melting data (second heat). The melting temperatures reported in the tables for the reat semi-smorphous propylene-ethylene copolymers are the peak melting temperatures from the first heating. For semi-amorphous polymers displaying multiple peaks, the highest melting peak temperature is reported. Areas under the curve were used to determine the heat of fusion ($\Delta H_f$) which can be used to calculate the degree of crystallinity. A value of 189 J/g was used as the equilibrium heat of fusion for 100% crystalline polypropylene. The percent crystallinity of a propylene polymer is calculated using the formula, [area under the curve (J/g)/189(J/g)]*100.

The semi-amorphous propylene-ethylene copolymers, which are derived from chiral metallocene-based catalysts, have a narrow inter and intramolecular composition distribution. The intermolecular composition distribution of the polymer was determined by thermal fractionation in hexane as follows: about 30 g of the crystallizable propylene-ethylene copolymer was cut into small cubes about ⅛th inch (0.32 cm) on the side and then introduced into a thick-walled glass bottle closed with screw cap along with 50 mg of Irganox 1076 antioxidant (Ciba-Geigy Corpn). 425 ml of hexane (a principal mixture of normal and iso-isomers) was added to the contents of the bottle and the sealed bottle was maintained at 23° C. for 24 hours. At the end of this period, the solution was decanted and the residue was treated with additional hexane for an additional 24 hours. At the end of this period, the two hexane solutions were combined and evaporated to yield a residue of the polymer soluble at 23° C. To the residue was added sufficient hexane to bring the volume to 425 ml and the bottle was maintained at 31° C. for 24 hours in a covered circulating water bath. The soluble polymer was decanted and an additional amount of hexane is added for another 24 hours at 31° C., prior to decanting. In this manner, fractions of the semi-amorphous propylene-ethylene copolymer soluble at 40° C., 48° C., 55° C. and 62° C. were obtained, at temperature increases of approximately 8° C. between stages. The soluble polymers were dried, weighed and analyzed for composition, as wt % ethylene content, by the IR technique described above. Soluble fractions obtained in the adjacent temperature increases are the adjacent fractions in the specification above. Data on different representative semi-amorphous propylene-ethylene copolymers are shown in Tables 2 and 3. EPR in Table 2 is an ethylene propylene rubber that does not contain crystallizable propylene species like the semi-amorphous copolymers. This EPR has 47% ethylene, a Mooney viscosity (ML 1+8 at 127 C) of 28 and a GPC polydispersity (Mw/Mn) of 2.3. It was obtained under the tradename Vistalon™ 457-by ExxonMobil Chemical in Houston, Tex.

TABLE 2

Solubility of Fractions of SAPEC's

| SAPEC | Fraction 1-Wt % soluble at 23° C. | Fraction 2- Wt % soluble at 31° C. | Fraction 3- Wt % soluble at 40° C. | Fraction 4- Wt % soluble at 48° C. |
|---|---|---|---|---|
| SAPEC-3 | 1.0 | 2.9 | 28.3 | 68.5 |
| SAPEC-4 | 6.5 | 95.7 | — | — |
| SAPEC-5 | 51.6 | 52.3 | — | — |
| SAPEC-6 | 18.7 | 83.6 | — | — |
| SAPEC-7 | 36.5 | 64.2 | — | — |
| EPR | 101.7 | — | — | — |

Note:
The sum of the fractions may in some cases add up to slightly greater than 100, due to imperfect drying of the polymer fractions.

TABLE 3

Composition of Fractions of SAPEC's obtained in Table 2

| SAPEC | Wt % ethylene in Fraction 1 | Wt % ethylene in Fraction 2 | Wt % ethylene in Fraction 3 | Wt % ethylene in Fraction 4 |
|---|---|---|---|---|
| SAPEC-3 | | | 8.0 | 7.6 |
| SAPEC-4 | 12.0 | 11.2 | — | — |
| SAPEC-5 | 16.8 | 16.5 | — | — |
| SAPEC-6 | 13.2 | 11.2 | — | — |

TABLE 3-continued

Composition of Fractions of SAPEC's obtained in Table 2

| SAPEC | Wt % ethylene in Fraction 1 | Wt % ethylene in Fraction 2 | Wt % ethylene in Fraction 3 | Wt % ethylene in Fraction 4 |
| --- | --- | --- | --- | --- |
| SAPEC-7 | 14.9 | 14.6 | — | — |
| EPR | 46.8 | | | |

Note:
Only fractions with more than 4% of the total mass of the polymer in Table 2 are analyzed for composition. The experimental accuracy in determination of the ethylene content is believed to be within about 0.4% absolute.

The above semi-amorphous propylene-ethylene copolymers SAPEC-1 and SAPEC-2 were combined with a metallocene-based propylene homopolymer to produce the blend compositions, as will be described later. SAPEC-1 and SAPEC-2 were first visbroken to reach an MFR of about 25 (range 20-30), prior to melt blending with polypropylene. The target 25 MFR is consistent with that of typical commercial polypropylene grades for spunbond nonwovens, which are in the 20 to 50 MFR range. Visbreaking is a widely used and well-accepted procedure to increase the melt flow rate of propylene polymers. The procedure typically involves melt compounding the propylene polymer in the presence of a specific amount of a peroxide [e.g. (2,5 dimethyl-2,5-di(t-butyl peroxy)hexane) available as Luperox 101 from AtoFina, Organic Peroxides Divn., Philadelphia, Pa.]. The amount is dependent on the degree of MFR increase desired. The visbreaking was done in the presence of some polypropylene (60/40 blend of the SAPEC and a metallocene-based propylene homopolymer) to provide additional crystallinity. The presence of the polypropylene aids in the extrusion compounding step by providing rapid solidification of the extruded strands in the water bath, easier chopping of the strands into pellets and free movement of the pellets through transfer lines.

Example 2

Visbreaking of Semi-Amorphous Propylene-Ethylene Copolymers SAPEC-1 and SAPEC-2

The polymer used along with the semi-amorphous propylene-ethylene copolymers during visbreaking was a propylene homopolymer, having an MFR of 7.5 dg/min and an Mw of 195,000 produced using a metallocene catalyst, namely, rac di-methyl siladiyl bis-(2-methyl, 4-phenyl indenyl)zirconium dimethyl activated with a silica bound activator of N,N-di-ethyl aniline tris(perfluorophenyl)boron in a pilot scale, two reactor, continuous, stirred tank, bulk liquid-phase process. In the catalyst, the zirconium loading was about 0.117 wt % and the boron loading about 0.12 wt %. The reactors were equipped with jackets for removing the heat of polymerization. The reactor temperature was set at 74° C. (165F) in the lead reactor and 68° C. (155F) in the tail reactor. Catalyst was fed at a rate of 1.2 g/hr. Tri-ethyl aluminum (TEAL; fed to the reactor as a 1 wt % solution in hexane solvent) was used as scavenger at a level of 20 ppm. The catalyst and silica bound activator, described above, were fed as a 10% slurry in mineral oil and were flushed into the reactor with propylene. Propylene monomer was fed into the lead reactor at a rate of 79.5 kg/hr (175 lb/hr) and to the tail reactor at a rate of 30 kg/hr (65 lb/hr). Hydrogen was added for molecular weight control at 1970 mppm in the lead reactor and 2220 mppm in the tail reactor. Polymer production rates were 20.5 kg/hr (45 lb/hr) in the lead reactor and 10 kg/hr (22 lb/hr) in the tail reactor. The reactor product was routed through a granules-handling system to separate and recover the final polymer product. The polymer discharged from the reactors had an MFR of 7.5 dg/min (GPC Mw 195,000, Mw/Mn 2.0, Mz/Mw 1.54). 68% of the final polymer product was derived from the first stage and 32% of the final product was derived from the second stage. The polymer was melt homogenized with 1500 ppm of Irganox-2215 (Ciba-Geigy Corporation) and pelletized. Visbreaking was conducted on blends of SAPEC-1 and SAPEC-2 with the 7.5 MFR propylene homopolymer discussed above. The blend ratio was 60 wt % SAPEC and 40 wt % propylene homopolymer. The visbreaking was carried out on a Reifenhauser extruder 5 equipped with a single screw (60 mm screw diameter; 24:1 L/D ratio; mixing screw). A summary of the visbreaking experiments is shown in Table 4.

TABLE 4

Visbreaking of Blends of SAPEC-1 and SAPEC-2 with Propylene Homopolymer (60 wt %/40 wt %)

| Example | Copolymer | Peroxide (ppm) | Post treatment MFR dg/min |
| --- | --- | --- | --- |
| Example 2-1 | SAPEC-1 | 800 | 20.0 |
| Example 2-2 | SAPEC-2 | 950 | 30.0 |

Both products, Examples 2-1 and 2-2, contained 60 wt % of semi-amorphous propylene-ethylene copolymer. Examples 2-1 and 2-2 were then used to prepare additional blends containing different amounts of semi-amorphous propylene-ethylene copolymer.

Example 3

Preparation of Blends of Semi-Amorphous Propylene-Ethylene Copolymer and Propylene Homopolymer Example 2-1 and Example 2-2 were melt mixed with a metallocene-based propylene homopolymer having an MFR of 24 dg/min (ASTM 1238, 2.16 kg, 230° C.), a density of 0.9 g/cc (ASTM D 792), and an Mw/Mn of 2 available from ExxonMobil Chemical Company in Houston, Tex. under the tradename ACHIEVE™ 3854 to produce several blends, shown in Table 5.

TABLE 5

Description of Final Blends of Ex 2-1 and Ex 2-2 and Achieve 3854

| | Ex-2-1 wt % | Ex-2-2 wt % | Achieve 3854 wt % | MFR dg/min of blend | Wt % ethylene in blend |
|---|---|---|---|---|---|
| Example 3-1 | 55.5 (33.3 wt % SAPEC-1 and 22.2 wt % PP) | | 44.5 | 21.1 | 5.0 |
| Example 3-2 | | 41.7 (25 wt % SAPEC-2 and 16.7 wt % PP) | 58.3 | 23.0 | 4.1 |
| Example 3-3 | | 25 (15 wt % SAPEC-2 and 10 wt % PP) | 75 | 22.0 | 2.4 |

Note:
PP refers to the 7.5 dg/min MFR metallocene homopolymer used during the visbreaking operation.

Polymer blend Examples 3-1 (33.3 wt % of semi-amorphous propylene-ethylene copolymer), 3-2 (25 wt % semi-amorphous propylene-ethylene copolymer) and 3-3 (15 wt % semi-amorphous propylene-ethylene copolymer) are all based on semi-amorphous propylene-ethylene copolymers that contain upwards of 14 wt %, ethylene (Table 1). This is higher than the ~12 wt % ethylene limit, beyond which the propylene-ethylene copolymers are believed to become immiscible in blends with polypropylene. This immiscibility leads to heterogeneous blends, with the semi-amorphous propylene-ethylene copolymers being finely dispersed in a matrix of polypropylene. A representation of this is shown in FIG. 1, which is a plot of tan δ(E"/E' from DMTA measurements) versus temperature for blend polymer Example 3-1. The figure shows the tan δ response in the region of the β relaxation (ie. Tg). Two distinct peaks are observed, corresponding to the respective Tgs of the polypropylene (at 0° C.) and the semi-amorphous propylene-ethylene copolymer (−25° C.). Blend polymer Examples 3-2 and 3-3, whose SAPEC component contains an even higher level of ethylene than Example 3-1, show a similar tan δ response.

Permanent tension set was measured on blend polymer Example 3-1 which contained 33.3 wt % of the semi-amorphous propylene ethylene copolymer, using the procedure outlined above. A mean permanent set of 187.5% was obtained.

Example 4

Preparation of Spunbond Fabrics from Blend Polymer Examples 3-1, 3-2 and 3-3

The blend polymers 3-1, 3-2 and 3-3 were first run on a fiber line to produce partially oriented yarns, to evaluate their fiber-forming capability. Polypropylene ACHIEVE 3854, described earlier, was used as control (also referred to in tables and figures as 3854). ACHIEVE 3854 is a well-regarded commercial product, widely used in the industry to fabricate fibers and spunbond fabrics. Fibers were prepared as spun, flat (non-lustre or low-lustre) partially oriented yarns by mechanical take-up of the fiber bundle from its extruded melt. A description of the fiber spinning process used can be found in U.S. Pat. No. 5,723,217 (column 13, lines 41 to 58) incorporated herein by reference. All three blend Examples 3-1, 3-2 and 3-3 spun well, in that take-up speeds before yarn breakage (ie. speed-to-break) were upwards of 4000 m/min, comparable to that for the control, and stable spinning conditions could be maintained. The fiber trial provided evidence for good spinnability and fiber formation for all three products.

The spunbond fabric trial was conducted on a Reicofil line made by the Reifenhauser Company, Germany. The extruder size was 70 mm with a 30:1 length:diameter ratio. The spinneret had 4036 die plate holes, each with a diameter of 0.6 mm. Continuous fibers were extruded, laid on an endless belt and then bonded to each other using heated calender rolls, one plain and the other bearing a pattern of raised points. The actual bonded area represented about 14.5% of the total web surface area.

Fabrics were produced from Examples 3-1, 3-2, 3-3 and ACHIEVE 3854 control. Three fabric bond temperatures (low, medium and high) were studied for each of the blend Examples 3-1,3-2 and 3-3. At each bond temperature, fabrics with basis weights of 17, 35 and 70 g/sq meter (gsm) were collected. The throughput was set at 0.3 g/hole/minute (ghm). To evaluate the influence of slip agent on the feel of the fabric, an oleamide masterbatch (6 wt % oleamide in Example 3-1 polymer base; 5 wt % let down to deliver 3000 ppm oleamide concentration in the fabric) was used at the line.

A description of the experiments and a summary of the run conditions on the Reicofil line are outlined in Table 6. Standard conditions for ACHIEVE 3854 were set initially and control fabrics, at different basis weights, were produced. Following the 3854, blend Examples 3-1,3-2 and 3-3 were run. Due to the presence of the lower crystallinity/lower melting semi-amorphous propylene-ethylene copolymers in blend Examples 3-1,3-2 and 3-3, 'drips' from partially molten fibers were observed on the conveyor belt. The extruder temperature settings were too high for these blend products. This required an adjustment to the 3854 line conditions. To assist the solidification of the fibers, the cooling air temperature was lowered (from 65° F. or 18° C. to 45° F. or 7° C.). Also, the cooling air blower speed was lowered (3000 rpm to 2500 rpm). These adjustments resolved the 'drips' and once out of the transition from 3854, stable operation was regained. The fiber diameters from the blend Example fabrics were observed to be slightly larger than those from the ACHIEVE 3854 control (by about 1 μm; see Table 6). This reflects a reduced level of orientation which can be remedied by optimizing the draw force acting on the fibers, through adjustments to the speed of the cooling and suction blowers. The fabric 'formation' (uniformity of distribution of fibers in the fabric) was observed to be satisfactory for all the blend Example fabrics.

Figure 2:
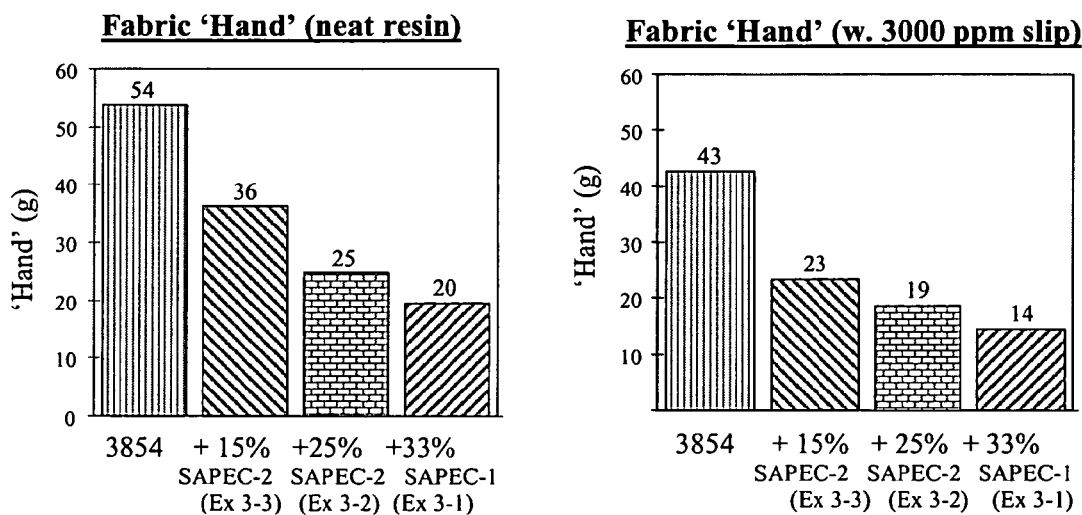
FIG. 2 is a comparison of spunbond nonwoven fabric softness in terms of 'Hand' (35 gsm fabrics) for a polypropylene homopolymer blended with different amounts of a semi-amorphous copolymer (~15% C2 content) versus the neat polypropylene homopolymer.

The fabrics were tested for 'hand' using a Handle-O-Meter instrument, described earlier. The 'hand' value (in grams) is a measure of the feel of the fabric. A fabric having the characteristic of softness will show a lower value of 'hand' when compared against fabric from homopolymer polypropylene (e.g. ACHIEVE 3854). A softer fabric generally shows better drapeability (ie. form-fitting coverage over an object) and has a more cloth-like feel. The Handle-O-Meter results for 35, 70 and 17 gsm fabrics are shown in Table 7A, B and C. 35 gsm data are plotted in FIG. 2. Fabric tensile properties for 35, 70 and 17 gsm fabrics are shown in Table 8A, B and C. Bonding curves, primarily for 35 gsm fabrics, are shown in FIGS. 3, 4 and 5. Finally, fabric tear data (MD tear) are presented in Table 9.

TABLE 6

Spunbond Fabric Experiments

| Sample ID | Bonding Temp (° F.) | Melt Temp at Die (° F.) | Belt Speed (mpm) | Blower speeds Suction (rpm) | Blower speed Cooling (rpm) | Thruput (ghm) | Basis Weight (gsm) | Fiber Diam (μm) |
|---|---|---|---|---|---|---|---|---|
| 3854 | 281.5 | 468 | 31 | 2486 | 3005 | 0.3 | 35 | 14.6 |
|  | 281.5 | 468 | 15.8 | 2487 | 3007 | 0.3 | 70 | 15.52 |
|  | 279.5 | 466 | 65.1 | 2461 | 3008 | 0.3 | 17 |  |
| w.oleamide | 281.5 | 466 | 31 | 2473 | 3002 | 0.3 | 35 | 14.42 |
| w.oleamide | 281.5 | 466 | 15.8 | 2473 | 3005 | 0.3 | 70 | 15.61 |
| Example 3-1 | 239 | 463 | 31 | 2176 | 2500 | 0.3 | 35 | 15.26 |
|  | 239 | 464 | 15.8 | 2177 | 2510 | 0.3 | 70 | 16.52 |
|  | 239 | 464 | 65.1 | 2176 | 2492 | 0.3 | 17 | 15.97 |
| w. oleamide | 239 | 465 | 31 | 2176 | 2501 | 0.3 | 35 | 15.61 |
| w. oleamide | 239 | 465 | 15.8 | 2177 | 2503 | 0.3 | 70 | 16.26 |
| w. oleamide | 239 | 465 | 65.1 | 2177 | 2498 | 0.3 | 17 | 16.09 |
|  | 253 | 464 | 15.8 | 1990 | 2508 | 0.3 | 70 | 16.71 |
|  | 253 | 464 | 65.1 | 1989 | 2500 | 0.3 | 17 | 16.69 |
|  | 253 | 464 | 31 | 1990 | 2507 | 0.3 | 35 | 15.84 |
|  | 217.5 | 464 | 31 | 1983 | 2516 | 0.3 | 35 | 16.52 |
|  | 217.5 | 463 | 15.8 | 1983 | 2515 | 0.3 | 70 | 15.69 |
|  | 217.5 | 463 | 65.1 | 1983 | 2516 | 0.3 | 17 | 15.68 |
| Example 3-2 | 238 | 466 | 31 | 2169 | 2503 | 0.3 | 35 | 16.94 |
|  | 238 | 465 | 15.8 | 2168 | 2509 | 0.3 | 70 |  |
|  | 238 | 464 | 65.1 | 2169 | 2506 | 0.3 | 17 |  |
|  | 258.5 | 464 | 31 | 2170 | 2505 | 0.3 | 35 | 15.98 |
|  | 258.5 | 464 | 15.8 | 2170 | 2509 | 0.3 | 70 |  |
|  | 258.5 | 464 | 65.1 | 2170 | 2499 | 0.3 | 17 |  |
| w. oleamide | 258 | 465 | 31 | 2170 | 2503 | 0.3 | 35 | 15.42 |
| w. oleamide | 258 | 464 | 15.8 | 2170 | 2503 | 0.3 | 70 |  |
| w. oleamide | 258 | 464 | 65.1 | 2169 | 2511 | 0.3 | 17 |  |
|  | 279.5 | 464 | 31.6 | 2175 | 2515 | 0.3 | 35 | 15.96 |
|  | 279.5 | 464 | 15.8 | 2176 | 2510 | 0.3 | 70 |  |
|  | 279.5 | 464 | 65.1 | 2175 | 2507 | 0.3 | 17 |  |
| Example 3-3 | 239.5 | 466 | 31.6 | 2167 | 2501 | 0.3 | 35 | 15.77 |
|  | 239.5 | 464 | 15.8 | 2167 | 2505 | 0.3 | 70 |  |
|  | 239.5 | 464 | 65.1 | 2166 | 2507 | 0.3 | 17 |  |
|  | 258 | 463 | 31.6 | 2164 | 2509 | 0.3 | 35 | 15.97 |
|  | 258 | 464 | 15.8 | 2165 | 2517 | 0.3 | 70 |  |
|  | 258 | 464 | 65.1 | 2165 | 2498 | 0.3 | 17 |  |
| w. oleamide | 258 | 466 | 31.6 | 2176 | 2502 | 0.3 | 35 | 15.99 |
| w. oleamide | 258 | 465 | 15.8 | 2177 | 2508 | 0.3 | 70 |  |
| w. oleamide | 258 | 465 | 65.1 | 2176 | 2506 | 0.3 | 17 |  |
|  | 279.5 | 464 | 31.6 | 2187 | 2525 | 0.3 | 35 | 15.62 |
|  | 279.5 | 464 | 15.8 | 2187 | 2526 | 0.3 | 70 |  |
|  | 279.5 | 464 | 65.1 | 2186 | 2528 | 0.3 | 17 |  |

Note:
The bonding temperature was measured as [Upper roll surface T + Lower roll surface T]/2

TABLE 7A

Handle-O-Meter Results on 35 gsm Fabrics (10 mm slot width)

| | Oleamide | Bonding T(° F.) | 'Hand' (g force) |
|---|---|---|---|
| ACHIEVE 3854 | No | 281.5 | 53.8 |
| | 3000 ppm | 281.5 | 42.6 |
| Example 3-1 | No | 239 | 19.5 |
| 33.3% of SAPEC-1 | 3000 ppm | 239 | 14.4 |
| (14.9% C$_2$ in SAPEC-1) | No | 253 | 23.3 |
| | No | 217.5 | 21.6 |
| Example 3-2 | No | 237.5 | 25.6 |
| 25% of SAPEC-2 | No | 258.5 | 24.6 |
| (16.2% C$_2$ in SAPEC-2) | 3000 ppm | 258 | 18.6 |
| | No | 279.5 | 29.9 |
| Example 3-3 | No | 239.5 | 33.8 |
| 15% of SAPEC-2 | No | 258 | 36.2 |
| (16.2% C$_2$ in SAPEC-2) | 3000 ppm | 258.5 | 23.4 |
| | No | 279.5 | 42.3 |

Bonding T was measured as [Upper roll surface T + Lower roll surface T]/2.

TABLE 7B

Handle-O-Meter Results on 70 gsm Fabrics (20 mm slot width)

| | Oleamide | Bonding T(° F.) | 'Hand' (g force) |
|---|---|---|---|
| ACHIEVE 3854 | No | 281.5 | 97.6 |
| | 3000 ppm | 281.5 | 76.4 |
| Example 3-1 | No | 239 | 28.8 |
| 33.3% of SAPEC-1 | 3000 ppm | 239 | 21.8 |
| (14.9% C$_2$ in SAPEC-1) | No | 253 | 32.8 |
| | No | 217.5 | 25.7 |
| Example 3-2 | No | 237.5 | 37.0 |
| 25% of SAPEC-2 | No | 258.5 | 41.0 |
| (16.2% C$_2$ in SAPEC-2) | 3000 ppm | 258 | 28.9 |
| | No | 279.5 | 51.7 |
| Example 3-3 | No | 239.5 | 54.6 |
| 15% of SAPEC-2 | No | 258 | 63.9 |
| (16.2% C$_2$ in SAPEC-2) | 3000 ppm | 258.5 | 46.8 |
| | No | 279.5 | 67.7 |

TABLE 7C

Handle-O-Meter Results on 17 gsm Fabrics (6.35 mm slot width)

| | Oleamide | Bonding T(° F.) | 'Hand' (g force) |
|---|---|---|---|
| ACHIEVE 3854 | No | 279.5 | 24.3 |
| Example 3-1 | No | 239 | 9.4 |
| 33.3% of SAPEC-1 | 3000 ppm | 239 | 9.2 |
| (14.9% C$_2$ in SAPEC-1) | No | 253 | 15.7 |
| | No | 217.5 | 11.2 |
| Example 3-2 | No | 237.5 | 13.4 |
| 25% of SAPEC-2 | No | 258.5 | 14.3 |
| (16.2% C$_2$ in SAPEC-2) | 3000 ppm | 258 | 12.4 |
| | No | 279.5 | 17.0 |
| Example 3-3 | No | 239.5 | 17.8 |
| 15% of SAPEC-2 | No | 258 | 17.3 |
| (16% C$_2$ in SAPEC-2) | 3000 ppm | 258.5 | 13.0 |
| | No | 279.5 | 18.9 |

TABLE 8A

Fabric Tensile Properties (35 gsm fabrics)

| | | Machine Direction | | Transv Direction | |
|---|---|---|---|---|---|
| | Bonding T (° F.) | Peak Force (g) | Elong (%) | Peak Force (g) | Elong (%) |
| 3854 | 281.5 | 16.84 | 62.32 | 8.18 | 64.49 |
| 3854 + slip | 281.5 | 15.45 | 57.96 | 7.73 | 65.61 |
| Example 3-1 | 239 | 10.04 | 74.12 | 6.91 | 83.44 |
| Ex 3-1 + slip | 239 | 7.57 | 69.14 | 5.16 | 82.36 |
| Ex 3-1 | 253 | 4.11 | 54.61 | 2.60 | 58.8 |
| Ex 3-1 | 217.5 | 6.37 | 49.94 | 4.89 | 66.31 |
| Example 3-2 | 237.5 | 8.16 | 49.46 | 5.10 | 56.87 |
| Ex 3-2 | 258.5 | 12.89 | 73.44 | 8.60 | 85.88 |
| Ex 3-2 + slip | 258 | 10.86 | 74.51 | 6.76 | 88.29 |
| Ex 3-2 | 279.5 | 11.76 | 57.78 | 7.79 | 70.22 |
| Example 3-3 | 239.5 | 7.49 | 29.47 | 4.04 | 38.77 |
| Ex 3-3 | 258 | 12.01 | 55.85 | 7.15 | 64.25 |
| Ex 3-3 + slip | 258.5 | 10.37 | 51.52 | 5.98 | 71.63 |
| Ex 3-3 | 279.5 | 15.30 | 66.83 | 9.15 | 77.15 |

MD and TD Peak Force were measured according to ASTM standard 5035-95(2003). MD and TD Peak Elongations % were also measured according to ASTM D5035-95(2003).

TABLE 8B

Fabric Tensile Properties (70 gsm fabrics)

| | | Machine Direction | | Transv Direction | |
|---|---|---|---|---|---|
| | Bonding T (° F.) | Peak Force (g) | Elong (%) | Peak Force (g) | Elong (%) |
| 3854 | 281.5 | 17.11 | 31.56 | 10.16 | 58.32 |
| 3854 + slip | 281.5 | 14.66 | 26.01 | 7.62 | 46.43 |
| Example 3-1 | 239 | 12.15 | 44.88 | 9.00 | 64.44 |
| Ex 3-1 + slip | 239 | 8.81 | 42.88 | 5.88 | 56.01 |
| Ex 3-1 | 253 | 17.60 | 61.58 | 13.58 | 83.11 |
| Ex 3-1 | 217.5 | 7.94 | 31.61 | 6.14 | 51.08 |
| Example 3-2 | 237.5 | 8.62 | 26.18 | 6.06 | 46.79 |
| Ex 3-2 | 258.5 | 18.06 | 50.40 | 13.22 | 72.17 |
| Ex 3-2 + slip | 258 | 12.83 | 49.27 | 7.99 | 63.93 |
| Ex 3-2 | 279.5 | 27.13 | 75.21 | 18.33 | 89.85 |
| Example 3-3 | 239.5 | 7.36 | 14.50 | 5.02 | 35.26 |
| Ex 3-3 | 258 | 12.20 | 23.56 | 7.48 | 42.16 |
| Ex 3-3 + slip | 258.5 | 10.38 | 25.19 | 5.69 | 40.91 |
| Ex 3-3 | 279.5 | 25.83 | 59.35 | 17.65 | 82.01 |

TABLE 8C

Fabric Tensile Properties (17 gsm fabrics)

| | | Machine Direction | | Transv Direction | |
|---|---|---|---|---|---|
| | Bonding T (° F.) | Peak Force (g) | Elong (%) | Peak Force (g) | Elong (%) |
| 3854 | 281.5 | 7.91 | 52.00 | 3.37 | 53.00 |
| Example 3-1 | 239 | 4.36 | 64.14 | 2.69 | 73.17 |
| Ex 3-1 + slip | 239 | 3.65 | 60.00 | 2.36 | 59.00 |
| Ex 3-1 | 253 | 11.29 | 70.00 | 7.34 | 76.00 |
| Ex 3-1 | 217.5 | 3.46 | 53.00 | 1.99 | 57.00 |
| Example 3-2 | 237.5 | 5.19 | 60.00 | 2.74 | 64.00 |
| Ex 3-2 | 258.5 | 4.99 | 47.00 | 2.77 | 53.00 |
| Ex 3-2 + slip | 258 | 4.06 | 46.00 | 2.49 | 56.00 |
| Ex 3-2 | 279.5 | 3.16 | 27 | 2.13 | 40.00 |
| Example 3-3 | 239.5 | 4.78 | 42.00 | 2.73 | 51.00 |
| Ex 3-3 | 258 | 6.82 | 60.00 | 3.37 | 60.00 |

TABLE 8C-continued

Fabric Tensile Properties (17 gsm fabrics)

|  | | Machine Direction | | Transv Direction | |
| --- | --- | --- | --- | --- | --- |
|  | Bonding T (° F.) | Peak Force (g) | Elong (%) | Peak Force (g) | Elong (%) |
| Ex 3-3 + slip | 258.5 | 5.44 | 55.00 | 3.45 | 66.00 |
| Ex 3-3 | 279.5 | 4.84 | 34.00 | 2.34 | 38.00 |

TABLE 9

MD Tear Strength of 35 gsm Fabrics

| | SAPEC Content (wt %) | Bonding T (° F.) | MD Tear Strength (g) |
| --- | --- | --- | --- |
| 3854 | 0 | 281.5 | 643.0 |
| 3854 + slip | 0 | 281.5 | 775.4 |
| Example 3-1 | 33.3 (14.9% C$_2$) | 239 | 745.2 |
| Ex 3-1 + slip | 33.3 | 239 | 1314.8 |
| Ex 3-1 | 33.3 | 253 | 749.6 |
| Ex 3-1 | 33.3 | 217.5 | 1201.0 |
| Example 3-2 | 25 (16.2% C$_2$) | 237.5 | 791 |
| Ex 3-2 | 25 | 258.5 | 572.1 |
| Ex 3-2 + slip | 25 | 258 | 1109.5 |
| Ex 3-2 | 25 | 279.5 | 484.4 |
| Example 3-3 | 15 (16.2% C$_2$) | 239.5 | 1421.3 |
| Ex 3-3 | 15 | 258 | 703.6 |
| Ex 3-3 + slip | 15 | 258.5 | 1314.7 |
| Ex 3-3 | 15 | 279.5 | 447.4 |

MD Tear strength was measured according to ASTM D 5734-95.

Reviewing the data in the tables and figures, the addition of semi-amorphous propylene-ethylene copolymers (SAPEC) to polypropylene homopolymer ACHIEVE 3854 results in a remarkable lowering in fabric hand. The blend product fabrics display a soft, aesthetically pleasing feel and improved drapeability over the neat polypropylene fabric. There is a need in the industry for polypropylene-based spunbond fabrics having such performance, as quantified by a Handle-O-Meter 'hand' value of ≦20 g, preferably ≦15 g, for 35 gsm fabrics. These targets are attained by the propylene-rich blends with semi-amorphous propylene-ethylene copolymers. The softness and fabric feel can be further enhanced via the incorporation of low levels of slip additive into the blend compositions, as demonstrated in FIG. 2. Together with the enhanced softness, the blend products show good processability on spunbond fabric lines, in that commercially competitive output rates can be maintained with good fabric formation (uniform distribution of fibers to provide even coverage across the fabric). This has been a problem when standard propylene random copolymers (e.g. 4 wt % ethylene RCP) have been evaluated to obtain soft fabrics. These RCPs can provide acceptable 'hand', however, processability, in terms of being able to attain commercially competitive output rates along with good fabric formation, has been poor. The blend fabrics offer an opportunity to reduce the optimum bonding temperature of ACHIEVE 3854, as shown in FIG. 4. This feature provides broader processing latitude and allows more efficient bonding of heavy basis weight fabrics (greater than 35 gsm). Higher calendar temperatures are typically needed for these bulky fabrics to obtain good bonding through the entire web thickness, however, the risk is that fibers in the outer layers (adjacent to the heated roll) could melt, weakening the strength and integrity of the fabric. A reduced value of bonding temperature minimizes this risk. The bonding of heavy basis weight fabrics (70 gsm) is illustrated in FIG. 5. The TD (transverse direction) peak tensile force for ACHIEVE 3854 at its optimum bonding temperature (305° F. or 151.6° C.) is 17.5 lb force (7.95 kg force), indicated by the dashed horizontal line. The blend fabrics show increasing tensile load values with increasing calendar surface temperatures, indicating that they have not yet reached their optimum bonding conditions (ie. peak of bonding curve). The data in FIG. 5 suggests that under optimum bonding conditions, the peak tensile load values will be higher than that for ACHIEVE 3854. This represents an advantage for the 70 gsm blend fabrics. Finally, the tear resistance (at optimum bonding) and tensile properties of the blend fabrics are seen to be quite satisfactory, comparable to the ACHIEVE 3854 polypropylene control (Tables 8 and 9).

All patents and patent applications, test procedures (such as ASTM methods), and other documents cited herein, including priority documents, are fully incorporated by reference to the extent such disclosure is not inconsistent with this invention and for all jurisdictions in which such incorporation is permitted. When numerical lower limits and numerical upper limits are listed herein, ranges from any lower limit to any upper limit are contemplated.

The invention claimed is:

1. A nonwoven article comprising a heterogeneous blend comprising:
   1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 2000 dg/min or less; and
   2) from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and or C4 to C10 alpha-olefin comonomers, said semi-amorphous polymers each having:
      a) heat of fusion of 4 to 70 J/g;
      b) a Melt Flow Rate of 0.1 to 2000 dg/min;
      c) an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
      d) an Mw/Mn of 1.5 to 4, and
      e) a propylene triad tacticity, as measured by $^{13}$C NMR, of 75% or greater; where the blend of the semi-crystalline and semi-amorphous polymers comprises less than 5 weight % filler, based upon the weight of the polymers and the filler, and the blend has:
         i) an MFR greater than 10 dg/min; and
         ii) a Permanent Set of greater than 65% (as measured on a 125 mil thick molded part); and
   where the nonwoven article has a Hand of 40 g or less at a fabric basis weight of 35 gsm.

2. The article of claim 1 wherein the semi-crystalline polymer comprises propylene and from 1 to 3 weight % of a C2 to C10 alpha olefin comonomer.

3. The article of claim 2 wherein the alpha-olefin comonomer is selected from the group consisting of ethylene, butene, pentene, hexene, heptene, octene, nonene, and decene.

4. The article of claim 2 wherein the alpha-olefin comonomer is selected from the group consisting of ethylene, butene, hexene, and octene.

5. The article of claim 2 wherein the alpha-olefin comonomer is ethylene.

6. The article of claim 1 wherein the semi-crystalline polymer comprises 0 weight % comonomer.

7. The article of claim 1 wherein the semi-crystalline polymer has a melting point of 120 to 165° C.

8. The article of claim 1 wherein the semi-crystalline polymer has a flexural modulus of between 1030 and 2070 MPa.

9. The article of claim 1 wherein the semi-amorphous polymer comprises propylene and from 12 to 20 weight % of a C2 to C10 alpha olefin comonomer.

10. The article of claim 9 wherein the alpha-olefin comonomer is selected from the group consisting of ethylene, butene, pentene, hexene, heptene, octene, nonene, and decene.

11. The article of claim 9 wherein the alpha-olefin comonomer is selected from the group consisting of ethylene, butene, hexene, and octene.

12. The article of claim 9 wherein the alpha-olefin comonomer is ethylene.

13. The article of claim 1 wherein the semi-amorphous polymer has a percent crystallinity of between 2 and 25%.

14. The article of claim 1 wherein the semi-amorphous polymer has a Mooney viscosity (1+4@125° C.) of 3 or more.

15. The article of claim 1 wherein the semi-amorphous polymer has a melt flow rate of 5 to 2000 dg/min.

16. The article of claim 1 wherein the semi-amorphous polymer has a melt flow rate of 20 to 1750 dg/min.

17. The article of claim 1 wherein the heterogeneous blend has a heat deflection temperature of 40° C. or more as measured under 1.8 MPa of pressure.

18. The article of claim 1 wherein the heterogeneous blend has a haze of 50% or less as measured on a 1 mm thick chip.

19. The article of claim 1 wherein the blend further comprises a nucleating and or clarifying agent.

20. The article of claim 19 wherein the blend has a haze of 20% or less as measured on a 1 mm thick chip.

21. The article of claim 20 wherein the blend has a haze of 18% or less.

22. The article of claim 20 wherein the blend has a haze of 16% or less.

23. The article of claim 20 wherein the blend has a haze of 14% or less.

24. The article of claim 20 wherein the blend has a haze of 12% or less.

25. The article of claim 1 wherein the optimum bonding temperature of the heterogeneous blend is at least 5° C. lower than the optimum bonding temperature of the same blend, except that the semi-amorphous polymer is absent.

26. The article of claim 25 where the optimum bonding temperature is at least 10° C. lower.

27. The article of claim 25 where the optimum bonding temperature is at least 15° C. lower.

28. The article of claim 25 where the optimum bonding temperature is at least 20° C. lower.

29. The article of claim 25 where the optimum bonding temperature is at least 25° C. lower.

30. The article of claim 25 where the optimum bonding temperature is at least 30° C. lower.

31. The article of claim 1 wherein the blend has a permanent set of 85% or more.

32. The article of claim 1 wherein the blend has a permanent set of 100% or more.

33. The article of claim 1 wherein the blend has a permanent set of 125% or more.

34. The article of claim 1 wherein the blend has a permanent set of 150% or more.

35. The article of claim 1 wherein the nonwoven article has a fabric basis weight of 35 gsm or more, has a TD Peak Tensile load at optimum bonding of at least 5% greater than the TD Peak Tensile load of the same blend except that the semi-amorphous polymer is absent, and has an optimum bonding temperature at least 10° C. lower than the optimum bonding temp of the same blend except that the semi-amorphous polymer is absent.

36. The article of claim 1 wherein the semi-amorphous polymer comprises from 12 to 20 weight % comonomer and is present at from 20 to 40 weight %, and wherein the article at 35 g/sq m basis weight has a hand value of 10 to 30 g, a transverse direction peak force at optimum bonding temperature greater than 5 g, a machine direction tear strength greater than 500 g, and an optimum bonding temperature 5° C. to 40° C. lower than that of the same article made from the same composition except that the semi-amorphous polymer is absent.

37. The article of claim 36 wherein the comonomer is ethylene.

38. The article of claim 1 wherein the semi-crystalline polymer has a melting point of 120 to 160° C. and a flexural modulus of 1030 to 2070 MPa; and the semi-amorphous polymer comprises 10 to 20 weight % comonomer, has a percent crystallinity of 2 to 25% and has a Mooney viscosity (1+4@125° C.) of 3 or more.

39. The article of claim 1 wherein the heterogeneous blend further comprises a slip agent.

40. The article of claim 1 wherein the heterogeneous blend further comprises from 50 ppm to 10 weight % of a slip agent, based upon the weight of the heterogeneous blend.

41. The article of claim 40 wherein the slip agent is selected from the group consisting of amides having the chemical structure $CH_3(CH_2)_7CH{=}CH(CH_2)_xCONH_2$ where x is 5 to 15.

42. The article of claim 40 wherein the slip agent is selected from the group consisting of: erucamide, oleylamide, oleamide, and stearamide.

43. The article of claim 1 wherein the heterogeneous blend further comprises from 50 ppm to 4000 ppm of a nucleating agent, based upon the weight of the total polymer present in the heterogeneous blend.

44. The article of claim 1 wherein the article is packaging material.

45. The article of claim 1 where the article is a package.

46. The article of claim 1 where the article is a nonwoven web.

47. The article of claim 1 where the article is a fabric.

48. The article of claim 1 where the nonwoven is spunbonded.

49. The article of claim 1 where the nowoven is meltblown.

50. The article of claim 1 where the article is a surgical gown or drape.

51. The article of claim 1 where the article is clothing.

52. The article of claim 1 where the article is a diaper.

53. The article of claim 50 where the article comprises a bactericidal agent.

54. The article of claim 1 where the article is selected from the group consisting of: nonwoven fabrics, hook and loop fasteners, fabrics, garments, clothing, medical garments, surgical gowns, surgical drapes, diapers, training thermal insulation, first aid dressings, medical wraps, fiberfill, outerwear, bed quilt stuffing, furniture padding, filter media, scrubbing pads, wipe materials, hosiery, automotive seats, upholstered furniture, carpets, carpet backing, filter media, disposable wipes, diaper coverstock, gardening fabric, geomembranes, geotextiles, sacks, housewrap, vapor barriers, breathable clothing, envelopes, tamper evident fabrics, protective packaging, and coasters.

55. The article of claim 1 wherein the heterogeneous blend has a continuous phase comprising the semi-crystalline polymer.

56. The article of claim 1 wherein the heterogeneous blend has a discontinuous phase comprising the semi-amorphous polymer.

57. The article of claim 1 wherein the heterogeneous blend has co-continuous phases of the semi-crystalline polymer and the semi-amorphous polymer.

58. The article of claim 1 wherein the blend is formed into staple fibers prior to being formed into the non-woven article.

59. The article of claim 58 wherein the staple fiber is crimped.

60. The fiber of claim 59 wherein the staple fiber is 7 to 200 mm long.

61. A process to produce the nonwoven article of claim 58, the process comprising:
  1) blending a first component comprising from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 2000 dg/min or less; and from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and or C4 to C10 alpha-olefin comonomers, said semi-amorphous polymers each having:
    a) heat of fusion of 4 to 70 J/g;
    b) a Melt Flow Rate of 0.1 to 2000 dg/min;
    c) an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
    d) an Mw/Mn of 1.5 to 4, and
    e) a propylene triad tacticity, as measured by $^{13}$C NMR, of 75% or greater; where the blend of the semi-crystalline and semi-amorphous polymers comprises less than 5 weight % filler, based upon the weight of the polymers and the filler, and the blend has:
      i) an MFR greater than 30 dg/min; and
      ii) a Permanent Set of greater than 65% (as measured on a 125 mil thick molded part); and
  2) extruding the blend composition to produce, finish, and wind a filament, then draw, finish, crimp, heat set and cut the filament into a staple fiber; and
  3) forming the staple fiber into a non-woven fabric, where the nonwoven article has a Hand of 40 g or less at a weight of 35 gsm.

62. The process of claim 61 wherein the staple fiber is 7 to 200 mm long.

63. A process to produce the nonwoven article of claim 58, the process comprising:
  1) blending a first component comprising from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 2000 dg/min or less; with from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and or C4 to C10 alpha-olefin comonomers, said semi-amorphous polymers each having:
    a) heat of fusion of 4 to 70 J/g;
    b) a Melt Flow Rate of 0.1 to 2000 dg/min;
    c) an Mw/Mn of 1.5 to 4, and
    d) a propylene triad tacticity, as measured by $^{13}$C NMR, of 75% or greater; where the blend of the semi-crystalline and semi-amorphous polymers comprises less than 5 weight % filler, based upon the weight of the polymers and the filler, and the blend has:
      i) an MFR greater than 30 dg/min; and
      ii) a Permanent Set of greater than 65% (as measured on a 125 mil thick molded part); and
  2) extruding the blend composition to produce, finish, and wind a filament, then draw, finish, crimp, heat set and cut the filament into a staple fiber; and
  3) forming the staple fiber into a non-woven fabric, where the nonwoven article has a Hand of 40 g or less at a weight of 35 gsm.

64. The process of claim 63 wherein the staple fiber is 7 to 200 mm long.

65. The process of claim 63 wherein the intermolecular compositional distribution of the semi-amorphous polymer is such that 90% by weight or more of the polymer is isolated as one or two adjacent, soluble fractions with the balance of the polymer in immediately preceding or succeeding fractions; and wherein each of these fractions has a wt % comonomer content with a difference of no greater than 10 wt % relative to the average wt % comonomer content of the copolymer.

* * * * *